(12) United States Patent
Marquardt et al.

(10) Patent No.: US 12,015,687 B2
(45) Date of Patent: Jun. 18, 2024

(54) SECURING COMMUNICATIONS IN A NETWORK FUNCTION VIRTUALIZATION (NFV) CORE NETWORK

(71) Applicant: T-Mobile Innovations LLC, Overland Park, KS (US)

(72) Inventors: Ronald R. Marquardt, Woodinville, WA (US); Lyle W. Paczkowski, Mission Hills, KS (US); Carl J. Persson, Olathe, KS (US); Arun Rajagopal, Leawood, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 249 days.

(21) Appl. No.: 17/724,366

(22) Filed: Apr. 19, 2022

(65) Prior Publication Data

US 2022/0239757 A1 Jul. 28, 2022

Related U.S. Application Data

(62) Division of application No. 16/698,639, filed on Nov. 27, 2019, now Pat. No. 11,363,114, which is a
(Continued)

(51) Int. Cl.
*H04L 67/60* (2022.01)
*H04L 9/32* (2006.01)
(Continued)

(52) U.S. Cl.
CPC ............ *H04L 67/60* (2022.05); *H04L 9/3234* (2013.01); *H04L 12/4641* (2013.01);
(Continued)

(58) Field of Classification Search
CPC .......................... H04L 9/3234; H04L 63/062
(Continued)

(56) References Cited

U.S. PATENT DOCUMENTS

| 5,928,363 A | 7/1999 | Ruvolo |
| 5,983,350 A | 11/1999 | Minear et al. |

(Continued)

FOREIGN PATENT DOCUMENTS

| WO | 2015039699 A1 | 3/2015 |
| WO | 2016102297 A1 | 6/2016 |
| WO | 2017062101 A1 | 4/2017 |

OTHER PUBLICATIONS

Notice of Allowance dated Oct. 5, 2016, U.S. Appl. No. 14/746,615, filed Jun. 22, 2015.
(Continued)

*Primary Examiner* — Badri Narayanan Champakesan

(57) ABSTRACT

A method of electronic communication via a virtual network function (NFV) implementation of a core network. The method comprises receiving a hypertext transfer protocol (HTTP) content request from a user equipment (UE), wherein the HTTP content request comprises an identification of a content source and determining by an orchestrator service that insufficient NFV processing capacity is available to perform the HTTP content request, where the orchestrator service is an application that executes on a first physical host. The method further comprises dynamically increasing the NFV processing capacity by the orchestrator service, performing the HTTP content request using the increased NFV processing capacity, and returning a HTTP content response to the UE, wherein the HTTP content response does not comprise identification of the content source.

16 Claims, 14 Drawing Sheets

Related U.S. Application Data division of application No. 14/872,936, filed on Oct. 1, 2015, now Pat. No. 10,542,115.

(51) Int. Cl.

| | |
|---|---|
| *H04L 9/40* | (2022.01) |
| *H04L 12/46* | (2006.01) |
| *H04L 61/3015* | (2022.01) |
| *H04L 61/4511* | (2022.01) |
| *H04L 61/5007* | (2022.01) |
| *H04L 61/503* | (2022.01) |
| *H04L 67/02* | (2022.01) |
| *H04L 101/35* | (2022.01) |
| *H04L 101/355* | (2022.01) |
| *H04L 101/668* | (2022.01) |

(52) U.S. Cl.
CPC ...... *H04L 61/3025* (2013.01); *H04L 61/4511* (2022.05); *H04L 61/5007* (2022.05); *H04L 61/503* (2022.05); *H04L 63/062* (2013.01); *H04L 63/20* (2013.01); *H04L 67/02* (2013.01); *H04L 2101/35* (2022.05); *H04L 2101/355* (2022.05); *H04L 2101/668* (2022.05)

(58) Field of Classification Search
USPC ............................................................. 713/150
See application file for complete search history.

(56) References Cited

U.S. PATENT DOCUMENTS

| | | |
|---|---|---|
| 6,775,772 B1 | 8/2004 | Binding et al. |
| 7,305,712 B2 | 12/2007 | Watt et al. |
| 7,325,083 B2 | 1/2008 | Watt et al. |
| 7,340,573 B2 | 3/2008 | Watt |
| 7,370,210 B2 | 5/2008 | Symes |
| 7,661,104 B2 | 2/2010 | Watt et al. |
| 7,702,951 B2 | 4/2010 | Yamamoto et al. |
| 7,849,296 B2 | 12/2010 | Watt et al. |
| 8,005,000 B1 | 8/2011 | Srinivasan |
| 8,090,797 B2 | 1/2012 | Chinta et al. |
| 8,171,483 B2 | 5/2012 | Nord et al. |
| 8,271,976 B2 | 9/2012 | Vega et al. |
| 8,280,944 B2 | 10/2012 | Laadan et al. |
| 8,443,230 B1 | 5/2013 | James-Roxby et al. |
| 8,649,770 B1 | 2/2014 | Cope et al. |
| 8,650,397 B2 * | 2/2014 | Haddad ............... H04L 63/062 713/168 |
| 8,712,407 B1 | 4/2014 | Cope et al. |
| 8,797,875 B2 | 8/2014 | Garcia Martin et al. |
| 8,842,578 B1 | 9/2014 | Zisapel et al. |
| 8,863,252 B1 | 10/2014 | Katzer et al. |
| 8,918,860 B1 | 12/2014 | Enderwick |
| 8,935,318 B1 | 1/2015 | Konerding et al. |
| 8,984,110 B1 | 3/2015 | Asveren |
| 8,996,644 B2 | 3/2015 | Pope |
| 9,047,441 B2 | 6/2015 | Xie et al. |
| 9,077,709 B1 | 7/2015 | Dall et al. |
| 9,104,836 B2 | 8/2015 | Burstein et al. |
| 9,118,655 B1 | 8/2015 | Paczkowski et al. |
| 9,161,227 B1 | 10/2015 | Bye et al. |
| 9,183,606 B1 | 11/2015 | Paczkowski et al. |
| 9,191,865 B1 | 11/2015 | Paczkowski et al. |
| 9,203,842 B2 | 12/2015 | Venkataramu et al. |
| 9,230,085 B1 | 1/2016 | Paczkowski et al. |
| 9,237,084 B2 | 1/2016 | Chapman |
| 9,251,384 B1 | 2/2016 | Potlapally et al. |
| 9,274,974 B1 | 3/2016 | Chen et al. |
| 9,282,898 B2 | 3/2016 | McRoberts et al. |
| 9,288,148 B1 | 3/2016 | Krishnaswamy et al. |
| 9,298,515 B2 | 3/2016 | McMurry et al. |
| 9,317,689 B2 | 4/2016 | Aissi |
| 9,319,220 B2 | 4/2016 | Grewal et al. |
| 9,324,016 B1 | 4/2016 | Cordes et al. |
| 9,374,363 B1 | 6/2016 | Paczkowski et al. |
| 9,384,028 B1 | 7/2016 | Felstaine et al. |
| 9,392,446 B1 | 7/2016 | Paczkowski et al. |
| 9,396,016 B1 | 7/2016 | Marquardt et al. |
| 9,407,612 B2 | 8/2016 | Sood et al. |
| 9,413,634 B2 | 8/2016 | Nadeau et al. |
| 9,444,886 B2 | 9/2016 | Rahman et al. |
| 9,450,866 B2 | 9/2016 | He et al. |
| 9,460,286 B1 | 10/2016 | Felstaine et al. |
| 9,462,084 B2 | 10/2016 | Connor et al. |
| 9,503,344 B2 | 11/2016 | Chakrabarti et al. |
| 9,503,363 B2 | 11/2016 | Sivabalan et al. |
| 9,509,587 B1 | 11/2016 | Marquardt et al. |
| 9,519,563 B2 | 12/2016 | Manghirmalani et al. |
| 9,537,741 B2 | 1/2017 | Chakrabarti et al. |
| 9,549,321 B2 | 1/2017 | Slavov et al. |
| 9,560,078 B2 | 1/2017 | Sood et al. |
| 9,565,168 B1 | 2/2017 | Marquardt et al. |
| 9,578,008 B2 | 2/2017 | Sood et al. |
| 9,578,664 B1 | 2/2017 | Paczkowski et al. |
| 9,613,190 B2 | 4/2017 | Ford et al. |
| 9,628,445 B2 | 4/2017 | Antonakakis |
| 9,648,044 B2 | 5/2017 | Islam et al. |
| 9,667,665 B1 | 5/2017 | Paczkowski et al. |
| 9,686,237 B2 | 6/2017 | DeCusatis et al. |
| 9,686,240 B1 | 6/2017 | Ray et al. |
| 9,692,743 B2 | 6/2017 | Islam et al. |
| 9,729,515 B1 | 8/2017 | Anantharaju |
| 9,742,790 B2 | 8/2017 | Sood et al. |
| 9,749,294 B1 | 8/2017 | Marquardt et al. |
| 9,769,854 B1 | 9/2017 | Paczkowski et al. |
| 9,781,016 B1 | 10/2017 | Marquardt et al. |
| 9,781,158 B1 * | 10/2017 | Wittenstein ......... H04L 63/1466 |
| 9,811,686 B1 | 11/2017 | Marquardt et al. |
| 9,819,661 B2 * | 11/2017 | Stern .................... H04L 9/3247 |
| 9,871,768 B1 | 1/2018 | Ray et al. |
| 9,979,699 B1 | 5/2018 | Marquardt et al. |
| 10,044,572 B1 | 8/2018 | Marquardt et al. |
| 10,250,498 B1 | 4/2019 | Bales et al. |
| 10,348,488 B1 | 7/2019 | Paczkowski et al. |
| 10,536,373 B1 | 1/2020 | Bales et al. |
| 10,542,115 B1 | 1/2020 | Marquardt et al. |
| 10,790,965 B1 | 9/2020 | Paczkowski et al. |
| 11,363,114 B1 | 6/2022 | Marquardt et al. |
| 2002/0091650 A1 | 7/2002 | Ellis |
| 2002/0107958 A1 | 8/2002 | Faraldo, II |
| 2003/0131229 A1 * | 7/2003 | Gladney ................ H04L 63/12 713/155 |
| 2003/0177387 A1 | 9/2003 | Osterwalder et al. |
| 2004/0139352 A1 | 7/2004 | Shewchuk et al. |
| 2004/0177269 A1 | 9/2004 | Belnet et al. |
| 2004/0181682 A1 | 9/2004 | Orinio et al. |
| 2004/0187117 A1 | 9/2004 | Orion et al. |
| 2004/0221163 A1 | 11/2004 | Jorgensen et al. |
| 2004/0240468 A1 | 12/2004 | Chin et al. |
| 2004/0260910 A1 | 12/2004 | Watt et al. |
| 2005/0068981 A1 | 3/2005 | Park et al. |
| 2005/0102603 A1 | 5/2005 | Tapper et al. |
| 2005/0114616 A1 | 5/2005 | Tune et al. |
| 2005/0120199 A1 * | 6/2005 | Carter .................... G06F 21/64 713/150 |
| 2005/0124382 A1 | 6/2005 | Britt et al. |
| 2005/0138421 A1 | 6/2005 | Fedronic et al. |
| 2005/0160210 A1 | 7/2005 | Watt et al. |
| 2005/0185672 A1 | 8/2005 | Endo et al. |
| 2005/0261985 A1 | 11/2005 | Miller et al. |
| 2006/0059337 A1 * | 3/2006 | Poyhonen ........... H04L 61/1511 713/165 |
| 2006/0146767 A1 | 7/2006 | Moganti |
| 2006/0190614 A1 | 8/2006 | Altman et al. |
| 2006/0253701 A1 | 11/2006 | Kim et al. |
| 2006/0259641 A1 | 11/2006 | Kim et al. |
| 2007/0174253 A1 | 7/2007 | Hodnett et al. |
| 2007/0282572 A1 | 12/2007 | Larus |
| 2008/0020745 A1 | 1/2008 | Bae et al. |
| 2008/0049640 A1 | 2/2008 | Heinz et al. |
| 2008/0162877 A1 | 7/2008 | Altman et al. |
| 2008/0165259 A1 | 7/2008 | Nobels |
| 2008/0189468 A1 | 8/2008 | Schmidt et al. |

(56) References Cited

U.S. PATENT DOCUMENTS

| | | |
|---|---|---|
| 2008/0301779 A1 | 12/2008 | Garg et al. |
| 2009/0007100 A1 | 1/2009 | Field et al. |
| 2009/0199177 A1 | 8/2009 | Edwards et al. |
| 2009/0210526 A1* | 8/2009 | Howell ............ H04L 29/12811 709/224 |
| 2009/0241108 A1 | 9/2009 | Edwards et al. |
| 2009/0254984 A1 | 10/2009 | Nice et al. |
| 2009/0300605 A1 | 12/2009 | Edwards et al. |
| 2009/0320048 A1 | 12/2009 | Watt et al. |
| 2010/0103837 A1 | 4/2010 | Jungck et al. |
| 2010/0106568 A1 | 4/2010 | Grimes |
| 2010/0192230 A1 | 7/2010 | Steeves et al. |
| 2010/0306361 A1* | 12/2010 | Boberg ............ H04L 29/12113 715/234 |
| 2011/0119748 A1 | 5/2011 | Edwards et al. |
| 2011/0173443 A1 | 7/2011 | Osterwalder et al. |
| 2012/0040662 A1 | 2/2012 | Rahman et al. |
| 2012/0117379 A1 | 5/2012 | Thornewell et al. |
| 2012/0304244 A1 | 11/2012 | Xie et al. |
| 2012/0331550 A1 | 12/2012 | Raj et al. |
| 2013/0055256 A1 | 2/2013 | Banga et al. |
| 2013/0070745 A1 | 3/2013 | Nixon et al. |
| 2013/0091568 A1 | 4/2013 | Sharif et al. |
| 2013/0159499 A1* | 6/2013 | Besehanic ........... H04L 61/2514 709/224 |
| 2013/0160139 A1 | 6/2013 | Goel et al. |
| 2013/0219010 A1 | 8/2013 | Mahendran et al. |
| 2013/0290563 A1 | 10/2013 | Fleischman et al. |
| 2013/0305333 A1 | 11/2013 | Katzer et al. |
| 2013/0333008 A1 | 12/2013 | Tapling et al. |
| 2013/0345530 A1* | 12/2013 | McRoberts ............ G16H 40/67 600/323 |
| 2014/0013327 A1 | 1/2014 | Sherwood et al. |
| 2014/0033316 A1 | 1/2014 | Paczkowski et al. |
| 2014/0047548 A1 | 2/2014 | Bye et al. |
| 2014/0052922 A1 | 2/2014 | Moyer et al. |
| 2014/0053003 A1 | 2/2014 | Moyer et al. |
| 2014/0075567 A1 | 3/2014 | Raleigh et al. |
| 2014/0092753 A1 | 4/2014 | Vasseur et al. |
| 2014/0181504 A1* | 6/2014 | Almahallawy ..... H04L 63/0823 713/156 |
| 2014/0201374 A1 | 7/2014 | Ashwood-Smith et al. |
| 2014/0229945 A1 | 8/2014 | Barkai et al. |
| 2014/0241247 A1 | 8/2014 | Kempf et al. |
| 2014/0259115 A1 | 9/2014 | Bakshi et al. |
| 2014/0281529 A1 | 9/2014 | Epp et al. |
| 2014/0281544 A1 | 9/2014 | Paczkowski et al. |
| 2014/0289826 A1 | 9/2014 | Croome |
| 2014/0298477 A1 | 10/2014 | Castro et al. |
| 2014/0304803 A1 | 10/2014 | Pope et al. |
| 2014/0325681 A1 | 10/2014 | Kleidermacher et al. |
| 2014/0331297 A1 | 11/2014 | Innes et al. |
| 2014/0337940 A1 | 11/2014 | Slavov et al. |
| 2014/0344912 A1 | 11/2014 | Chapman, II et al. |
| 2014/0373012 A1 | 12/2014 | Ylitalo et al. |
| 2015/0046676 A1 | 2/2015 | Archibald et al. |
| 2015/0072726 A1 | 3/2015 | Stern |
| 2015/0074745 A1 | 3/2015 | Stern et al. |
| 2015/0074764 A1 | 3/2015 | Stern |
| 2015/0089246 A1 | 3/2015 | Kanai et al. |
| 2015/0117409 A1 | 4/2015 | Ghai |
| 2015/0117455 A1 | 4/2015 | Umesh et al. |
| 2015/0169885 A1 | 6/2015 | Paczkowski et al. |
| 2015/0172928 A1 | 6/2015 | Katzer et al. |
| 2015/0180730 A1 | 6/2015 | Felstaine et al. |
| 2015/0195149 A1 | 7/2015 | Vasseur et al. |
| 2015/0195281 A1 | 7/2015 | Venkataramu et al. |
| 2015/0215308 A1 | 7/2015 | Manolov et al. |
| 2015/0220937 A1 | 8/2015 | Iannace et al. |
| 2015/0237035 A1 | 8/2015 | Islam et al. |
| 2015/0244717 A1 | 8/2015 | Jin et al. |
| 2015/0248283 A1 | 9/2015 | Gschwind et al. |
| 2015/0248554 A1 | 9/2015 | Dumitru et al. |
| 2015/0358248 A1 | 12/2015 | Saha et al. |
| 2015/0365352 A1 | 12/2015 | Xiang |
| 2015/0370704 A1 | 12/2015 | Kato |
| 2015/0373050 A1 | 12/2015 | Dayan et al. |
| 2015/0381423 A1 | 12/2015 | Xiang |
| 2016/0004876 A1 | 1/2016 | Bye et al. |
| 2016/0007190 A1 | 1/2016 | Wane |
| 2016/0043944 A1 | 2/2016 | Felstaine et al. |
| 2016/0057102 A1 | 2/2016 | Wei et al. |
| 2016/0057171 A1 | 2/2016 | DeCusatis et al. |
| 2016/0057788 A1 | 2/2016 | Sharma et al. |
| 2016/0073283 A1 | 3/2016 | Grayson et al. |
| 2016/0080323 A1 | 3/2016 | McKay et al. |
| 2016/0086172 A1 | 3/2016 | Kamal et al. |
| 2016/0094573 A1 | 3/2016 | Sood et al. |
| 2016/0119141 A1 | 4/2016 | Jing et al. |
| 2016/0119374 A1 | 4/2016 | Williams et al. |
| 2016/0127323 A1 | 5/2016 | Antonakakis |
| 2016/0127333 A1* | 5/2016 | Sood ....................... H04L 63/06 380/44 |
| 2016/0142396 A1 | 5/2016 | McRoberts et al. |
| 2016/0149748 A1 | 5/2016 | Pan |
| 2016/0149921 A1 | 5/2016 | Potlapally et al. |
| 2016/0157084 A1 | 6/2016 | Tsubouchi |
| 2016/0170848 A1 | 6/2016 | Yang et al. |
| 2016/0180089 A1 | 6/2016 | Dalcher |
| 2016/0182499 A1 | 6/2016 | Sharaga et al. |
| 2016/0182567 A1 | 6/2016 | Sood et al. |
| 2016/0205004 A1 | 7/2016 | Chou et al. |
| 2016/0212016 A1 | 7/2016 | Vrzic et al. |
| 2016/0212620 A1 | 7/2016 | Paczkowski et al. |
| 2016/0219076 A1 | 7/2016 | Paczkowski et al. |
| 2016/0226663 A1 | 8/2016 | Jones et al. |
| 2016/0226907 A1 | 8/2016 | Weiss et al. |
| 2016/0226912 A1 | 8/2016 | Clark et al. |
| 2016/0226913 A1 | 8/2016 | Sood et al. |
| 2016/0234725 A1 | 8/2016 | Paczkoski et al. |
| 2016/0253664 A1 | 9/2016 | Yuan et al. |
| 2016/0323200 A1 | 11/2016 | Xiang et al. |
| 2016/0337329 A1 | 11/2016 | Sood et al. |
| 2016/0344560 A1 | 11/2016 | Caceres et al. |
| 2016/0350150 A1 | 12/2016 | Marquardt et al. |
| 2016/0352537 A1 | 12/2016 | Marquardt et al. |
| 2016/0366105 A1 | 12/2016 | Smith et al. |
| 2016/0366123 A1 | 12/2016 | Smith et al. |
| 2016/0373474 A1* | 12/2016 | Sood ....................... G06F 21/53 |
| 2016/0378685 A1 | 12/2016 | Spurlock et al. |
| 2016/0379003 A1 | 12/2016 | Kapoor et al. |
| 2017/0005990 A1 | 1/2017 | Birger et al. |
| 2017/0012968 A1 | 1/2017 | Feng et al. |
| 2017/0012975 A1 | 1/2017 | Ilyadis et al. |
| 2017/0034284 A1 | 2/2017 | Smith et al. |
| 2017/0068817 A1 | 3/2017 | Ali et al. |
| 2017/0093806 A1 | 3/2017 | Phegade et al. |
| 2017/0102957 A1 | 4/2017 | Marquardt et al. |
| 2017/0126413 A1 | 5/2017 | Grobman et al. |
| 2017/0142024 A1 | 5/2017 | Fromentoux et al. |
| 2017/0142163 A1 | 5/2017 | Sood et al. |
| 2017/0149798 A1 | 5/2017 | Antonakakis |
| 2017/0161501 A1 | 6/2017 | Sood et al. |
| 2017/0187723 A1 | 6/2017 | Islam et al. |
| 2017/0208038 A1 | 7/2017 | Hinaman et al. |
| 2017/0214694 A1 | 7/2017 | Yan |
| 2017/0230428 A1 | 8/2017 | Paczkowski et al. |
| 2017/0308872 A1 | 10/2017 | Uhr et al. |
| 2017/0310647 A1 | 10/2017 | Hu et al. |
| 2017/0347308 A1 | 11/2017 | Chou et al. |
| 2018/0082390 A1 | 3/2018 | Leidner et al. |
| 2018/0101844 A1 | 4/2018 | Song et al. |
| 2018/0191503 A1 | 7/2018 | Alwar et al. |
| 2018/0218342 A1 | 8/2018 | Lim et al. |
| 2019/0019188 A1 | 1/2019 | Leidner et al. |
| 2019/0079950 A1 | 3/2019 | Ramabaja |

OTHER PUBLICATIONS

Notice of Allowance dated May 12, 2017, U.S. Appl. No. 15/403,166, filed Jan. 10, 2017.

(56) References Cited

OTHER PUBLICATIONS

FAIPP Pre-Interview Communication dated Jul. 25, 2016, U.S. Appl. No. 14/703,885, filed May 5, 2015.
Notice of Allowance dated Sep. 20, 2016, U.S. Appl. No. 14/703,885, filed May 5, 2015.
FAIPP Pre-Interview Communication dated Feb. 7, 2017, U.S. Appl. No. 14/847,992, filed Sep. 8, 2015.
Notice of Allowance dated Apr. 25, 2017, U.S. Appl. No. 14/847,992, filed Sep. 8, 2015.
FAIPP Pre-Interview Communication dated Dec. 15, 2017, U.S. Appl. No. 15/655,080, filed Jul. 20, 2017.
Notice of Allowance dated Jan. 30, 2018, U.S. Appl. No. 15/655,080, filed Jul. 20, 2017.
FAIPP Pre-Interview Communication dated Mar. 9, 2017, U.S. Appl. No. 14/930,146, filed Nov. 2, 2015.
Notice of Allowance dated May 26, 2017, U.S. Appl. No. 14/930,146, filed Nov. 2, 2015.
FAIPP Pre-Interview Communication dated Jan. 12, 2018, U.S. Appl. No. 15/686,324, filed Aug. 25, 2017.
Notice of Allowance dated Apr. 16, 2018, U.S. Appl. No. 15/686,324, filed Aug. 25, 2017.
FAIPP Pre-Interview Communication dated Apr. 20, 2017, U.S. Appl. No. 14/879,324, filed Oct. 9, 2015.
Notice of Allowance dated Jul. 3, 2017, U.S. Appl. No. 14/879,324, filed Oct. 9, 2015.
FAIPP Pre-Interview Communication dated Oct. 19, 2017, U.S. Appl. No. 14/872,936, filed Oct. 1, 2015.
Final Office Action Apr. 17, 2018, U.S. Appl. No. 14/872,936, filed Oct. 1, 2015.
Office Action dated Oct. 30, 2018, U.S. Appl. No. 14/872,936, filed Oct. 1, 2015.
Final Office Action dated Apr. 19, 2019, U.S. Appl. No. 14/872,936, filed Oct. 1, 2015.
Notice of Allowance dated Sep. 17, 2019, U.S. Appl. No. 14/872,936, filed Oct. 1, 2015.
Office Action dated Jul. 24, 2017, U.S. Appl. No. 14/879,327, filed Oct. 9, 2015.
Final Office Action dated Feb. 7, 2018, U.S. Appl. No. 14/879,327, filed Oct. 9, 2015.
Notice of Allowance dated Nov. 21, 2016, U.S. Appl. No. 14/793,344, filed Jul. 7, 2015.
Notice of Allowance dated Sep. 11, 2017, U.S. Appl. No. 15/602,057, filed May 22, 2017.
FAIPP Pre-Interview Communication dated Oct. 9, 2018, U.S. Appl. No. 15/284,506, filed Oct. 3, 2016.
Notice of Allowance dated Nov. 28, 2018, U.S. Appl. No. 15/284,506, filed Oct. 3, 2016.
FAIPP Pre-Interview Communication dated Aug. 8, 2019, U.S. Appl. No. 16/246,311, filed Feb. 14, 2019.
Notice of Allowance dated Sep. 10, 2019, U.S. Appl. No. 16/246,311, filed Feb. 14, 2019.
Notice of Allowance dated Mar. 11, 2019, U.S. Appl. No. 15/686,312, filed Aug. 8, 2017.
Notice of Allowance dated Jun. 4, 2020, U.S. Appl. No. 16/417,612, filed May 20, 2019.
FAIPP Pre-Interview Communication dated Aug. 20, 2021, U.S. Appl. No. 16/698,639, filed Nov. 27, 2019.
FAIPP Office Action dated Dec. 8, 2021, U.S. Appl. No. 16/698,639, filed Nov. 27, 2019.
Notice of Allowance dated Feb. 18, 2022, U.S. Appl. No. 16/698,639, filed Nov. 27, 2019.
Network Functions Virtualisation, "An Introduction, Benefits, Enablers, Challenges & Call for Action," Oct. 22-24, 2012, "SDN an OpenFlow World Congress," Darmstadt-Germany.
Network Functions Virtualisation, "Network Operator Perspectives on Industry Progress," Oct. 14-17, 2012, "SDN an OpenFlow World Congress," Darmstadt-Germany.
Foreign Communication from a Related Counterpart—International Search Report and Written Opinion dated Oct. 21, 2016, filed on Aug. 11, 2016, International Application No. PCT/US2016/046648.
Foreign Communication from a Related Counterpart, Preliminary Report on Patentability, dated Apr. 19, 2018, Application No. PCT/US2016/046648, filed on Aug. 11, 2016.
Foreign Communication from a Related Counterpart, Communication Pursuant to Rules 161(2) and 162 EPC, dated Mar. 13, 2018, Application No. 16854034.2, filed on Feb. 6, 2018.
Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.
Mahy, et al., entitled, "Traversal Using Relays around NAT (TURN): Relay Extensions to Session Traversal Utilities for NAT (STUN)," Apr. 2010, Internet Engineering Task Force (IETF), Request for Comments: 5766. (Year: 2010).
Marquardt, Ronald R., et al., "System and Method for Trusted Operability When Moving Between Network Functions Virtualization States," filed on Aug. 11, 2016, International Application No. PCT/US2016/046648.

\* cited by examiner

SECURING COMMUNICATIONS IN A NETWORK FUNCTION VIRTUALIZATION (NFV) CORE NETWORK

CROSS-REFERENCE TO RELATED APPLICATIONS

This application is a divisional of and claims priority under 35 U.S.C. § 120 to U.S. patent application Ser. No. 16/698,639, filed on Nov. 27, 2019, entitled "Securing Communications in a Network Function Virtualization (NFV) Core Network," by Ronald R. Marquardt, et al., which is a divisional of and claims priority under 35 U.S.C. § 120 to U.S. patent application Ser. No. 14/872,936, filed on Oct. 1, 2015, entitled "Securing Communications in a Network Function Virtualization (NFV) Core Network," by Ronald R. Marquardt, et al., now U.S. Pat. No. 10,542,115 issued Jan. 21, 2020, all of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information.

SUMMARY

In an embodiment, a method of electronic communication via a virtual network function (NFV) implementation of a core network is disclosed. The method comprises receiving a hypertext transfer protocol (HTTP) content request from a user equipment (UE), wherein the HTTP content request comprises an identification of a content source and determining by an orchestrator service that insufficient NFV processing capacity is available to perform the HTTP content request, where the orchestrator service is an application that executes on a first physical host. The method further comprises dynamically increasing the NFV processing capacity by the orchestrator service, performing the HTTP content request using the increased NFV processing capacity, and returning a HTTP content response to the UE, wherein the HTTP content response does not comprise identification of the content source.

In another embodiment, a method of domain name resolution is disclosed. The method comprises receiving a first domain name lookup request that comprises a service name and, in response to receiving the first domain name lookup request, looking up an internet protocol (IP) address of a server based on the service name. The method further comprises creating a mapping between a one-time-use domain name and the IP address, where the one-time-use domain name is created dynamically, transmitting a reply to the first domain name lookup request comprising the one-time-use domain name, and receiving a second domain name lookup request that comprises the one-time-use domain name. The method further comprises, in response to receiving the second domain name lookup request, looking up the IP address based on the one-time-use domain name, transmitting a reply to the second domain name lookup request comprising the IP address, and, after looking up the IP address based on the one-time-use domain name, destroying the mapping between the one-time-use domain name and the IP address.

In another embodiment, a method of providing a trusted communication service using network function virtualization (NFV) is disclosed. The method comprises determining by a trusted orchestrator service that a communication processing load of a common function supported by at least one virtual server executing in a NFV core network is greater than a predefined processing load threshold, where the trusted orchestrator service is an application that executes in a trusted security zone of a first physical host that provides hardware assisted security and, in response to the determination of the processing load being greater than the predefined processing load threshold, creating by the trusted orchestrator service a second virtual server on a second physical host that provides hardware assisted security. The method further comprises requesting by the trusted orchestrator service a plurality of trust keys from a trusted repository of trust keys and initiating by the trusted orchestrator service at least one instance of the common function in the second virtual server, wherein the at least one instance of the common function is configured with at least one of the plurality of trust keys received from the trusted repository.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
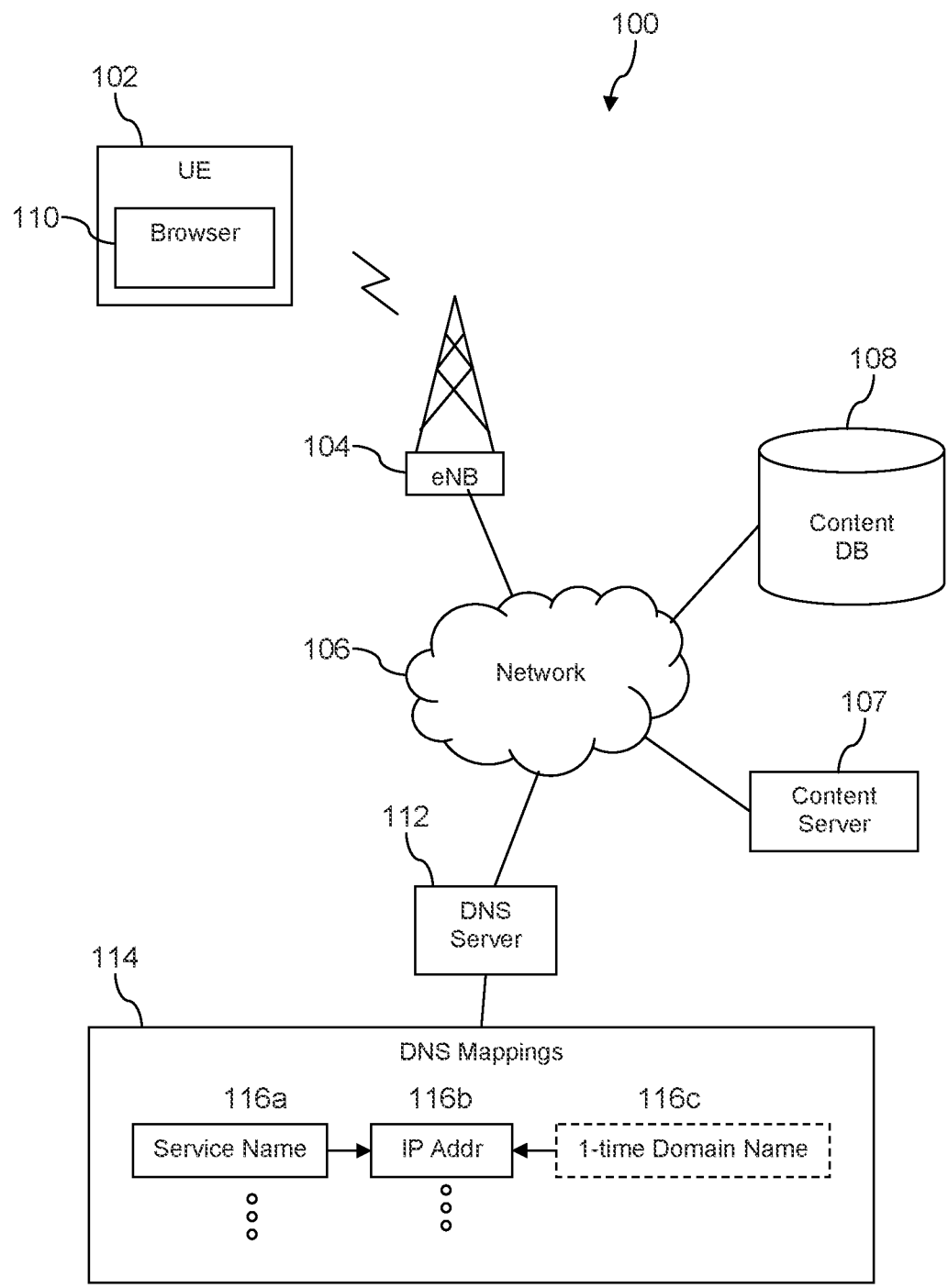
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches several independent but complimentary secure communication mechanisms that may be used to increase the security of communications in a core network (e.g., in the communication network infrastructure maintained by a communication service provider). The mechanisms may be deployed independently of each other or they may advantageously be combined with each other in some circumstances. Some commonly used communication protocols may be readily exploited to breach security of communication systems and/or to attack a service provided via a communication network. Such vulnerability may slow adoption of new applications or deployment of new services. The increased security offered by the secure communication mechanisms taught herein may provide desirable comfort and confidence on the part of communication carriers and contribute to the more prompt adoption of a new network function virtualization communication paradigm, increasing the economic efficiency of network operations.

A hypertext transfer protocol (HTTP) GET message typically receives a response message that contains a header that identifies the IP address of the content source. The present disclosure teaches suppressing that needless inclusion of the IP address of the content source in the HTTP header in the response message, which may be referred to as a taciturn or quiet HTTP protocol. This may reduce the chance of a packet sniffing engine on the Internet sniffing the address of the content source in the response message and targeting the content server with a denial of service (DOS) attack.

A one-time-use domain name construct is taught herein. A web browser executing on a user equipment (UE) may render a page that provides a link to a service. The service is identified by an abstract service name. A UE may be a mobile telecommunications device. When the link is clicked on, the web browser responds by sending out a DNS lookup request including the abstract service name. The lookup request is routed to a special domain name system (DNS) server. The special DNS server looks up an Internet Protocol (IP) address based on the abstract service name. The special DNS server creates a one-time-use domain name and stores a mapping of the one-time-use domain name to the IP address associated with the abstract service name. The special DNS server returns a DNS lookup response containing the one-time-use domain name. The web browser responds to the DNS lookup response by posting the text of the one-time-use domain name to a browser field and sends a second DNS lookup request including the one-time-use domain name. The second lookup request is routed to the special DNS server. The special DNS server looks up the IP address mapped to the one-time-use domain name, destroys the association between the one-time-use domain name and the IP address, and returns a DNS lookup response containing the IP address. The web browser responds by requesting content and/or service from the IP address.

When the same or a different web browser sends a lookup request containing the same abstract service name to the special DNS server, the DNS server associates a different one-time-use domain name to the IP address associated with the abstract service name and returns that different one-time-use domain name to the requesting web browser. In an embodiment, the one-time-use domain name may be generated as a random string of characters. A portion of the one-time-use domain name may be meaningful and statically defined for the same abstract service name while the remaining portion of the one-time-use domain name may be a random string of characters. For example, if the abstract service name is Texas Hospital Records, the one-time-use domain name may comprise a "TxHospRecs" portion combined with a random character string. In an embodiment, the randomized portion of the one-time-use domain name may be repeated at a low frequency rate, for example as a function of the number of different unique combinations of random characters. For example, if 8 random characters are employed in the one-time-use domain name, a finite number of combinations of those 8 random characters is possible and repetition of the one-time-use domain name may occur after a large number of DNS lookups of the abstract service name.

The one-time-use domain name described above prevents a user of an electronic device executing the web browser (e.g., a user of a mobile smart phone) from learning the domain name, which can support secure communication under some circumstances. Additionally, if combined with the quiet HTTP method described above, the IP address itself is exposed less to sniffing malware that may be watching. In an embodiment, the web browser may be a trusted web browser, and the trusted web browser and the special DNS server may communicate with each other via a trusted communication channel, and the DNS server may encrypt the IP address using an encryption key known to the trusted web browser before sending it to the trusted web browser. In a trusted DNS lookup exchange, the UE and the DNS server may exchange trust tokens to establish the trusted communication channel. For example, the trusted web browser may send the first DNS lookup request with the abstract service name and a trust token associated with the trusted web browser and/or the UE and may send the second DNS lookup request with the one-time-use domain name and the trust token.

Core network functions may be factored into common functions, and the common functions may be executed in virtual servers executing on physical hosts in a cloud computing environment. This may be referred to as network function virtualization (NFV). When trusted communications is desired, communication end points may execute communication applications that execute in trusted security zones that provide hardware assisted security. Trusted security zones and hardware assisted security are discussed further hereinafter. The communication between the end-points is typically provided through core network functions. To provide trusted end-to-end communication channels, the NFV core network desirably provides support for trusted execution.

In an embodiment, an orchestrator application mediates call flows among common functions executing in virtual servers in the NFV core network. The orchestrator, or another component executing in the NFV core network, dynamically starts additional virtual servers to execute additional instances of common functions and stops virtual servers as needed to handle dynamically changing communication loads in the NFV core network. In the case of trusted communication, the orchestrator or other application executes in trust and starts additional virtual servers on physical hosts that are known to the orchestrator to feature hardware support for trusted execution (e.g., hardware assisted security). The orchestrator obtains a plurality of trust keys from a trusted key repository and provisions the newly started virtual server on the physical host supporting trusted execution with the trust keys. This may be said to enable the newly started virtual server for trusted execution. It is understood that the virtual server need not execute solely in trust but is enabled to transition to execute in the trusted operation mode as called upon by the orchestrator in the course of providing a trusted end-to-end communication service.

Figure 1B:
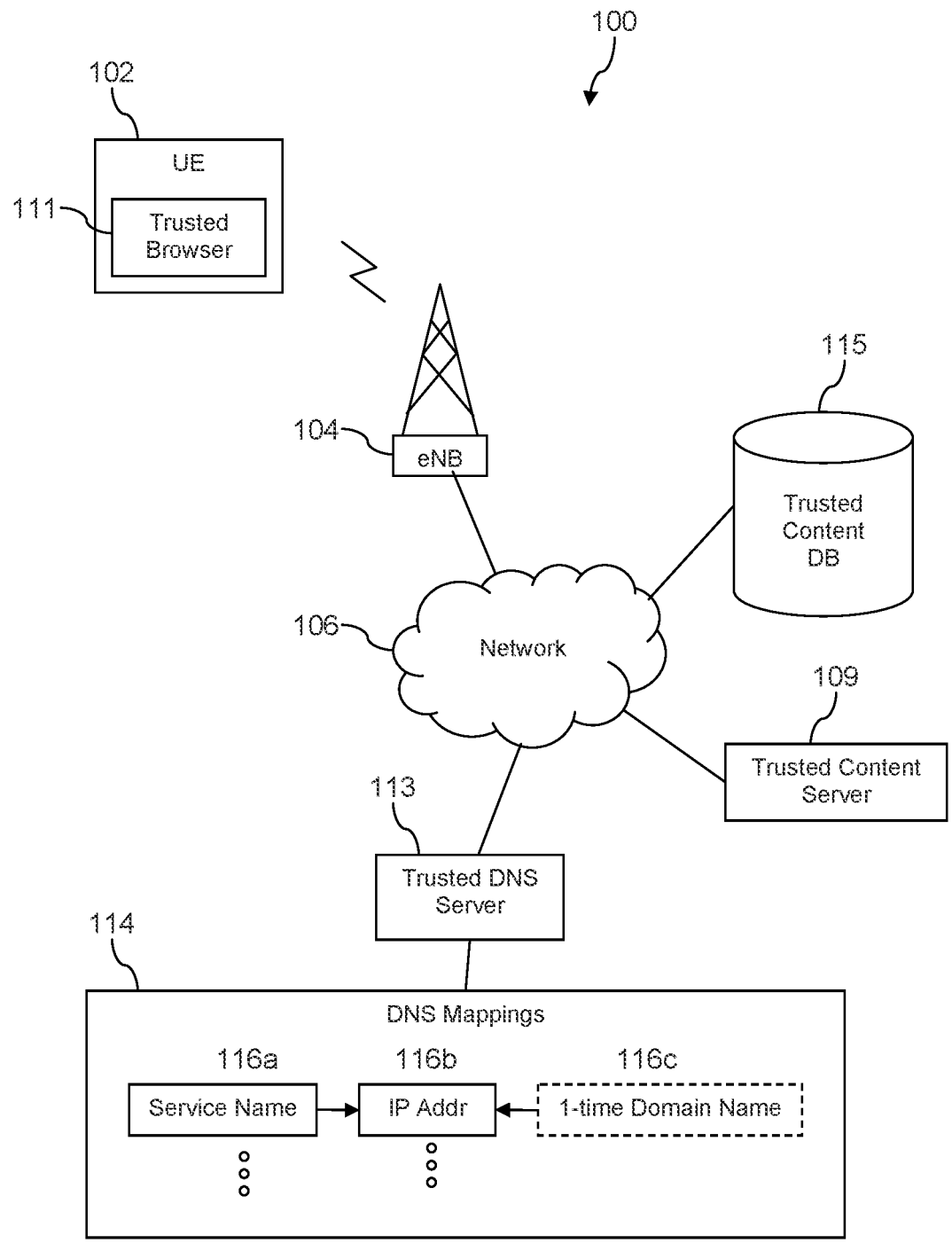
FIG. 1B is a block diagram of another communication system according to an embodiment of the disclosure.

Turning now to FIGS. 1A and 1B, a system 100 is described. In an embodiment, system 100 comprises a user equipment (UE) 102 that communicates with a network 106 via a wireless link provided by an enhanced node B (eNB) 104. The UE 102 may be a mobile smart phone, a media player, a personal digital assistant (PDA), a laptop computer, a notebook computer, a tablet computer, a wearable computer, or a headset computer. The network 106 may comprise one or more private networks, one or more public networks, or a combination thereof. The eNB 104 may be a base transceiver station (BTS) or a cell tower. The UE 102 may access the network 106 to obtain a variety of communication services. The UE 102 may request content based on a user of the UE 102 clicking on a link in a web page presented on a display of the UE 102 by a web browser application 110. The content may be served by a content server 107 from a content data store 108. The web browser application 110 may obtain an IP address of the content server 107 and/or content stored in the data store 108 through one or more domain name system (DNS) lookup requests directed to a DNS server 112. The DNS server 112 may lookup a mapping of the provided name to an IP address of the content server 107 in a DNS mappings data store 114.

The DNS server 112 may provide a one-time-use domain name functionality. The web browser application 110 may render a link in a web page presented on a display of the UE 102, where the link identifies an abstract communication service. When the link is selected (e.g., a user touches the link presented on a touchscreen of the UE 102), the web browser application 110 sends a DNS lookup request containing the name of the abstract communication service to the DNS server 112 for translation. The DNS server 112 searches the DNS mappings data store 114 based on the abstract communication service name and finds the service name 116a that is associated with or linked to an IP address 116b of the communication service associated with the abstract communication service name. The DNS server 112 dynamically creates a one-time-use domain name 116c and associates or links the one-time-use domain name 116c to the IP address 116b. The DNS server 112 returns the one-time-use domain name 116c in a DNS lookup response to the web browser application 110. The web browser application 110 may present the one-time-use domain name 116c in a browser window on the display of the UE 102. By presenting a one-time-use domain name 116c instead of the prior art static domain name, the opportunity to capture and store the static domain name is defeated. In this case, the one-time-use domain name 116c may be captured and stored, but other than a single use the one-time-use domain name 116c will not map to an IP address.

The web browser application 110, in response to receiving the one-time-use domain name 116c, sends a second DNS lookup request containing the one-time-use domain name 116c to the DNS server 112. The DNS server 112 searches the DNS mappings data store 114 based on the one-time-use domain name 116c and reads the IP address 116b associated with the one-time-use domain name 116c. The DNS server 112 destroys the association between the one-time-use domain name 116c and the IP address 116b and returns the IP address 116b in a DNS lookup response to the web browser application 110. After the association of the one-time-use domain name 116c to the IP address 116b is destroyed, any attempts to lookup the IP address 116b based on the one-time-use domain name 116c will fail.

In an embodiment, the DNS server 112 may send both the IP address 116b and the one-time-use domain name 116c to the web browser application 110 in response to the first DNS lookup request. In this case, the DNS server 112 may not ever associate the one-time-use domain name to the IP address 116b. This may be referred to in some contexts as a dummy domain name. The purpose of the dummy domain name may be to satisfy application programming interface (API) call expectations, to satisfy security functions of the web browser application 110, and/or to provide an expected domain name in the web browser window on a display of the UE 102. For example, even if the user of the UE 102 sees the partially randomized domain name "TxHospRecs8#V84$g" presented in the web browser, he or she may deem that feedback assuring in the context of having initiated a request for records on a recent hospital stay.

The web browser application 110 may send an HTTP GET or other HTTP request to the host computer associated with the IP address 116b, for example to the content sever 107 to retrieve content from the content data store 108. The content may be returned to the web browser application 110, and the web browser application 110 may render the content and present it on the display of the UE 102. In an embodiment, the IP address 116b may be associated with some other communication service that the host computer associated with the IP address 116b provides, and that service may be rendered for the web browser application 110 or other application executing on the UE 102.

In an embodiment, the web browser application 110 does not provide access to the IP address 116b to a user of the UE 102 or to other applications executing on the UE 102. Further the web browser application 110 may not store the IP address 116b but may immediately consume it when sending the HTTP GET to the IP address 116b. The mechanism of the one-time-use domain name may provide security against denial of service (DOS) attacks and against other vulnerabilities.

In an embodiment (now with reference to FIG. 1B), the UE 102 comprises a trusted web browser 111 or has a trust operation mode. When the trusted web browser 111 determines that it is requesting a DNS lookup for a trusted abstract communication service name (e.g., based on a standardized format, prefix, or suffix of the abstract service name), the trusted web browser 111 may hand over processing to a trusted web browser component and/or to a web browser trustlet that executes in a trusted security zone of the UE 102. A web browser trustlet may comprise instructions that are an extract of the full web browser application instructions, where the trustlet instructions are to be executed in the trusted security zone. The trusted web browser 111 communicates with a trusted DNS server 113 via a trusted end-to-end communication link. For more details on a trusted end-to-end communication infrastructure, see U.S. patent application Ser. No. 13/532,588, filed Jun. 25, 2012, entitled "End-to-end Trusted Communications Infrastructure," by Leo Michael McRoberts, et al., which is incorporated herein by reference in its entirety. The DNS server may be a trusted DNS server 113 and/or may comprise a DNS server trustlet that provides trusted instructions for handling trusted communications and trusted DNS lookup operations.

In an embodiment, the trusted DNS server 113 may encrypt the IP address 116b before returning it to the trusted web browser 111 in a DNS lookup response. The trusted DNS server 113 may encrypt the IP address 116b with an encryption key known to the trusted web browser 111 and/or with a trust key provisioned into the web browser trustlet. Encrypting the IP address 116b may make it more difficult to intercept by packet sniffing malware in the network 106 or more difficult to use. In an embodiment, the trusted web browser 111 sends the request for communication service to the IP address 116b over a trusted end-to-end communication link with the IP address 116b encrypted along this communication link, hence preventing packet sniffing malware in the network 106 from learning the IP address 116b when the trusted web browser 111 uses the IP address 116b for obtaining communication service (for example requesting trusted content from a trusted content server 109, from a trusted content data store 115, or requesting another trusted communication service).

In an embodiment, the web browser 110/111 and the content server 107/109 may communicate using a quiet or taciturn HTTP communication protocol. The standard HTTP communication protocol may be "chatty" and return optional information in the HTTP header such as the IP address of the content server 107/109. This information is optional because the web browser 110/111 would have already requested the desired content. This optional information may be sniffed by packet sniffing malware in the network 106 that thereby identifies the IP address of the content server 107/109 and uses that IP address in a DoS attack. Use of the taciturn HTTP communication protocol may provide advantages in either trusted or normal communication paradigms.

Figure 2:
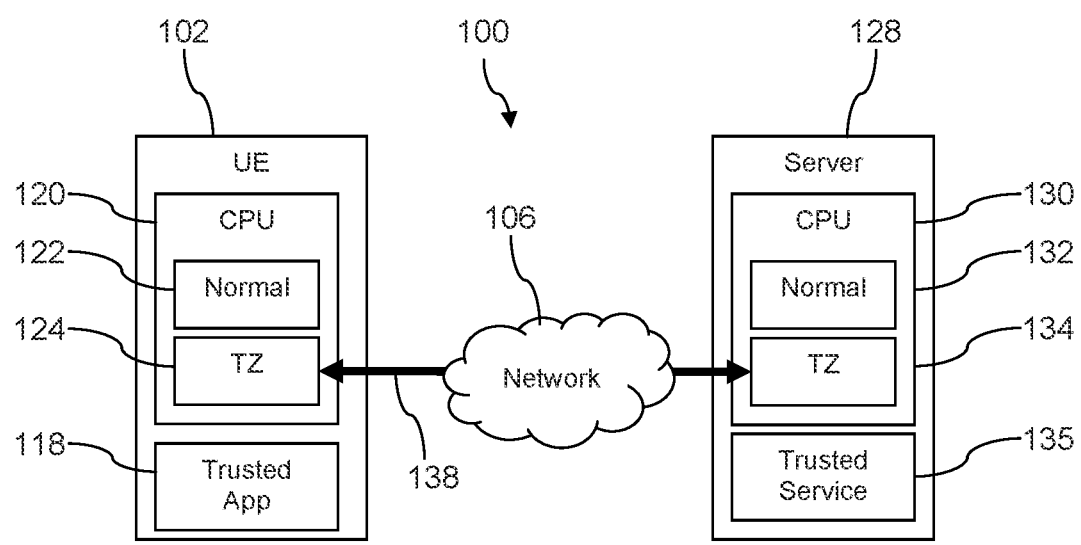
FIG. 2 is an illustration of an aspect of trusted communication according to an embodiment of the disclosure.

Turning now to FIG. 2, a further portion of the wireless communication system 100 is illustrated. The UE 102 is illustrated as communicating with a server computer 128 via a trusted bearer 138. The server 128 comprises a processor 130 that comprises a normal portion 132 and a trust zone portion 134. Under this circumstance, the trust zone 124 of the UE 102 is communicating with the trust zone 134 of the server 128 via the network 106 via the trusted bearer path 138 having continuity of trust. Any of the trusted communication described above may be conducted along lines described here with reference to FIG. 2 and as described further in the McRoberts patent application incorporated by reference above.

The trusted communication may involve transport over the trusted bearer 138 of sensitive confidential or financial information. For example, the UE 102 may be sending and/or receiving sensitive health records, medical reports, or biometric data over the trusted bearer 138 to a trusted service 135 executing on the server 128. In an embodiment, the server 128 may be executing a trusted medical records application that stores the transmitted information in a data store and/or retrieves medical records information from a data store. In an embodiment, the trusted web browser 111 may be accessing trusted content from the trusted content server 109 via the trusted bearer 138.

Figure 3:
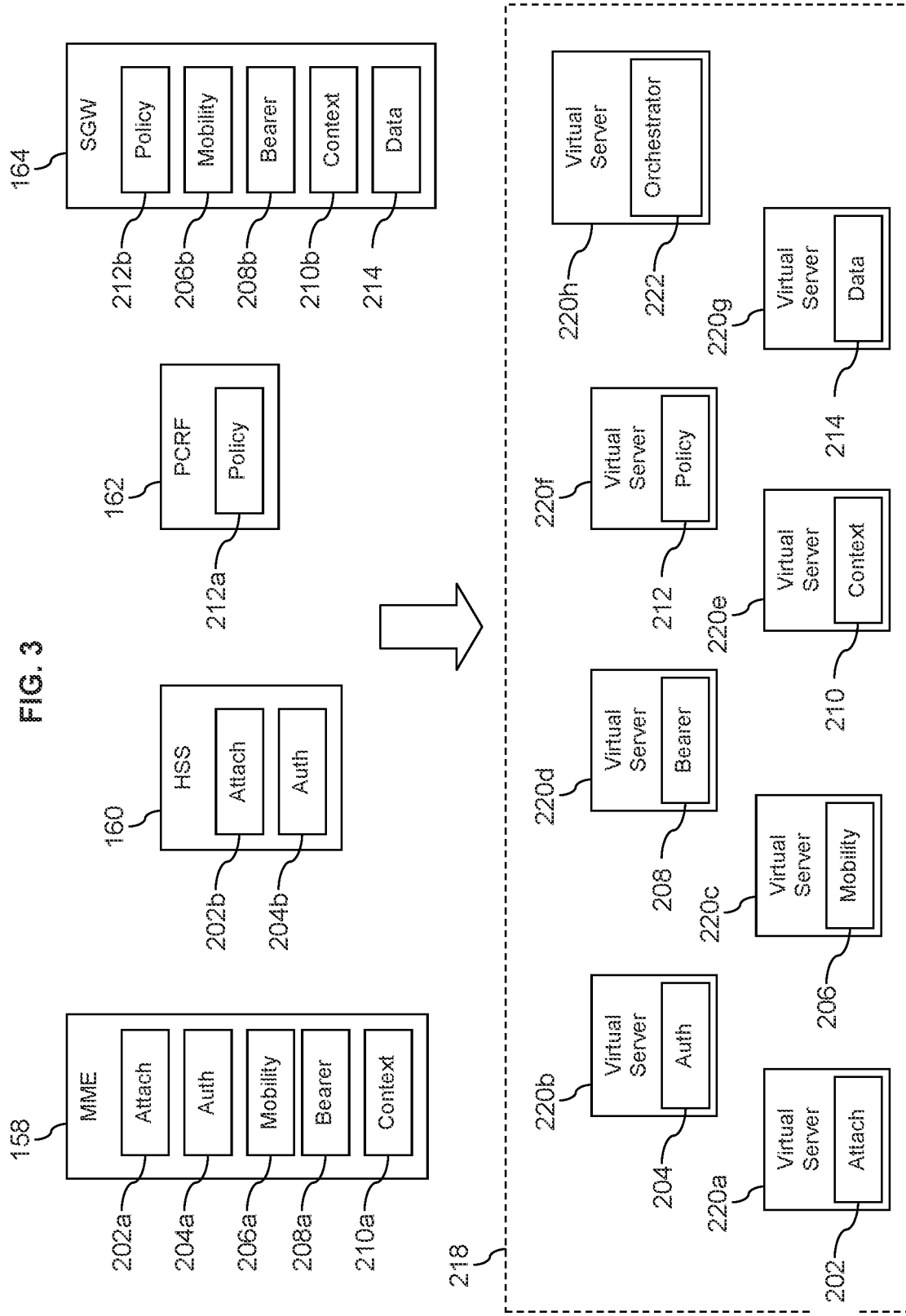
FIG. 3 is an illustration of a virtualized network function communication paradigm according to an embodiment of the disclosure.

Turning now to FIG. 3, the virtualized network function (VNF) communication paradigm is described. The traditional communication core network may be considered to comprise independent physical servers, each independent server providing one of the network functions. For example, the mobility management entity 158, the home subscriber server 160, the policy and charging rules function server 162, and the serving gateway 164. In some cases, to handle communication processing loads, a network function may be distributed on a plurality of servers. It is understood that the communication network may comprise many other communication nodes, notably routers and other servers.

Each of the traditionally structured network function servers provide their processing functionality by executing one or more functions, for example a network attach function 202, an authentication function 204, a mobility function 206, a bearer function 208, a context function 210, a policy function 212, and a data function 214. Since some of these functions are performed by a plurality of network function servers, there is duplication of these functions in the traditionally structured network. This duplication may result in maintenance and/or common behavior problems over time.

One skilled in the art understands what these functions are, but for the sake of others reading this specification a thumbnail description of the functions is provided here. It is understood that the described common functions may perform additional tasks or functions that may not be mentioned here. It is further understood that other common functions may be factorized from traditional network functions and may be supported by the network function virtualization paradigm using the virtual computing environment 218.

The network attach function 202 provides functions that may be used by a service to attach to the network and communicate (e.g., a network attach function may be performed on behalf of the UE 102 in order for it to obtain communication service on the network 106). The authentication function 204 provides functions that may be used to authenticate users, for example to authenticate a user of the UE 102 who wishes to obtain communication service on the network 106. The mobility function 206 provides functions to support mobile communications, for example handoffs and continuity for the UE 102 when it is engaged in a voice call or other communication session. The bearer function 208 provides functions that contribute to maintaining a network connection over a period of time to support providing communication service (e.g., to carry bearer traffic). The context function 210 provides functions that promote service continuity during handoff, interruption, or transfer. The policy function 212 provides functions to support policy managed or policy constrained access to or use of a service. The data function 214 provides functions to support data creation, reading, update, and deletion (CRUD) functions.

The communication core network may be restructured, at least in part, as common functions executing in virtual servers in a virtual computing environment 218 that are called by an orchestrator application 222 or by a state control application that provides one of the traditional network functions (e.g., one of MME 158, HSS 160, PCRF 162, SGW 164, etc.) by calling the appropriate common functions and passing parameters or intermediate results between and/or among the common functions in a desired sequence. For example, an attach common function 202 may execute in a first virtual server 220a, an authentication common function 204 may execute in a second virtual server 220b, a mobility common function 206 may execute in a third virtual server 220c, a bearer common function 208 may execute in a fourth virtual server 220d, a context common function 210 may execute in a fifth virtual server 220e, a policy common function 212 may execute in a sixth virtual server 220f, and a data common function 214 may execute in a seventh virtual server 220g. The functionality of the MME 158, hence, may be provided by executing the attach common function 202 in the first virtual server 220a, the authentication common function 204 in the second virtual server 220b, the mobility common function 206 in the third virtual server 220c, the bearer common function 208 in the fourth virtual server 220d, and the context common function 210 in the fifth virtual server 220e.

The functionality of the HSS 160 may be provided by executing the attach common function 202 on the first virtual server 220a and by executing the authentication common function 204 on the second virtual server 220b. Thus, the common functionality of network attach can be provided to both the MME 158 and to the HSS 160 from the same attach common function 202 executing on the virtual server 220a. This restructuring of the traditional siloed network functions into common functions may be referred to as network function factorization or factorization. Different traditional network functions would be associated with different orchestrators 222 and would execute on different virtual servers 220.

A single virtual server 220 may concurrently execute a plurality of instances of a common function. For example, the first virtual sever 220a may concurrently execute 2 instances of the attach common function 202, 4 instances of the attach common function 202, 8 instances of the attach common function 202, or some other number of instances of the attach common function 202. Additionally, a plurality of virtual servers 220, each executing instances of the same common function, may be deployed to carry a communication load. For example, 2, 3, or more instances of the first virtual sever 220a may execute instances of the attach common function 202. In an embodiment, any one virtual server 220 executes instances of only one common function. For example, no virtual server 220 would concurrently execute instances of different common functions.

Figure 4:
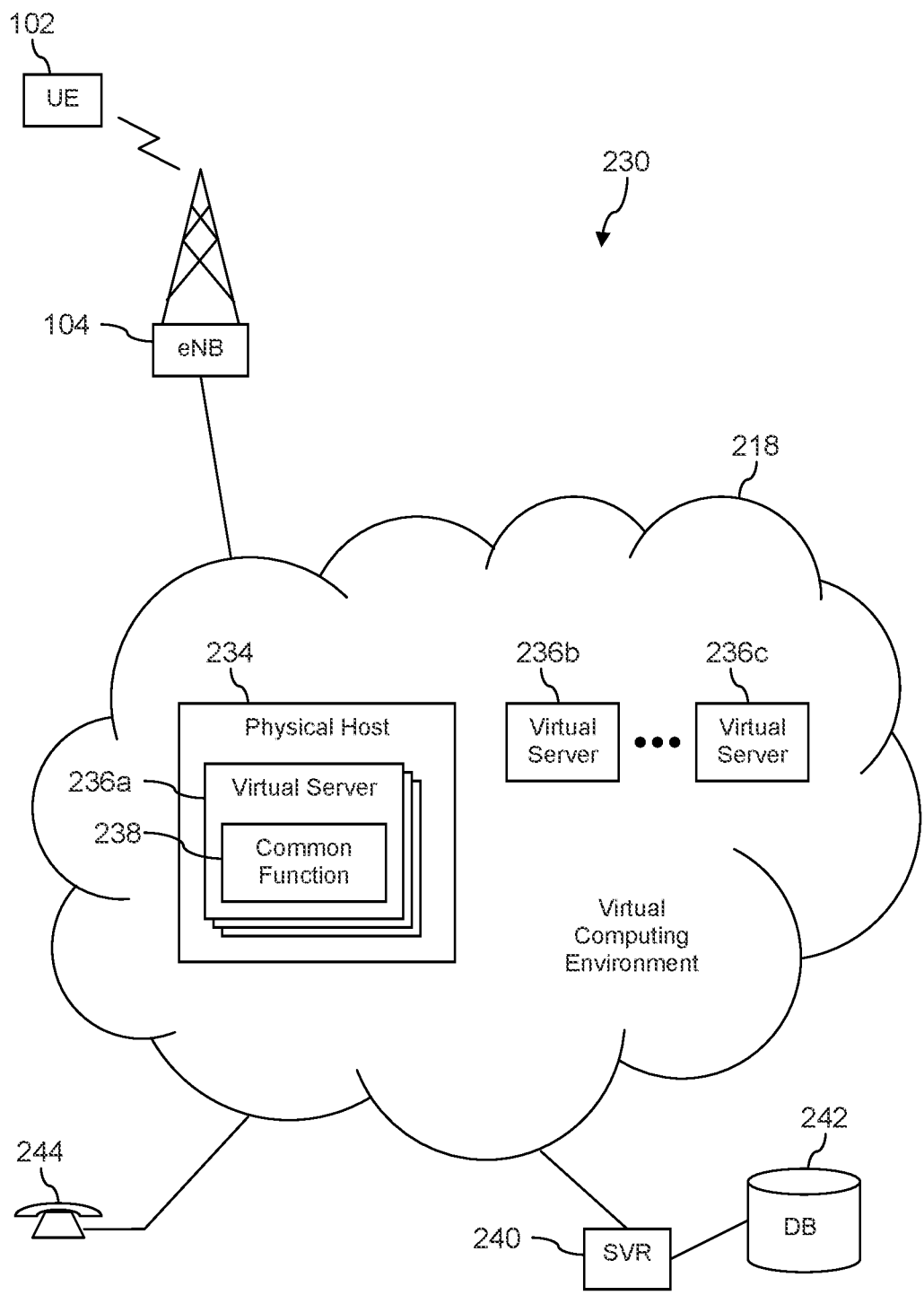
FIG. 4 is a block diagram of yet another communication system according to an embodiment of the disclosure.

Turning now to FIG. 4, a communication system 230 is described. From some points of view, the communication system 230 is substantially similar to the communication system 100 described above with reference to FIG. 1A and/or FIG. 1B. For example, from the point of view of the UE 102 and the enhanced node B 104, the systems 100, 230 may be indistinguishable. From the point of view of a content server 240 (or application server) or of a telephone 244, the systems 100, 230 may be indistinguishable. Communication between the enhanced node B 104 and the content server 240 or the telephone 244 provides data and/or voice services in substantially similar ways over substantially similar interfaces, regardless of what implementation of the core network—system 100 or system 230—is deployed. The use of a virtual computing environment 218 to provide at least some of the core network functionality can provide significant advantages to the wireless communication service provider.

The virtual computing environment 218 may support ease of maintenance, ease of upgrading, ease of expansion and contraction of compute resources. The virtual computing environment 218 may be provided with a private environment of compute resources or with a public deployment of compute resources. Said in another way, the virtual computing environment 218 may be a private cloud computing environment owned, operated, and managed by a wireless communication service provider. Alternatively, the virtual computing environment 218 may be a public cloud computing deployment owned, operated, and managed by a cloud computing service provider and supporting not only the core network functionality of a wireless communication service provider but also supporting computing needs of web-based enterprises, large on-line retail sales enterprises, governmental entities, and the like.

The virtual computing environment 218 may comprise a physical host 234 or physical server that provides a variety of compute resources. The physical host 234 comprises processors (e.g., microprocessors, digital signal processors, graphics processors), main memory, mass storage (e.g., disk drives), and network interfaces. The processors may comprise a single processor unit or may comprise multiple processor units. For example, a processor may comprise a quad-core processor having four distinct processing units. Alternatively, a processor may contain some other number of distinct processing units. The mass storage may be located in physical proximity to the computer blade on which a virtual server executes that uses the mass storage. Alternatively, the mass storage may be located remote from the computer blade on which the virtual server 236 executes and may be addressed or accessed logically. The physical host 234 may be partly deployed as blade computers in a rack of an equipment cabinet. A single virtual server 236 may execute on one computer host or computer blade, or a plurality of virtual servers 236 may execute on one computer host or computer blade.

The virtual server 236 may be built or deployed as a server image. A server image may comprise instructions or logic that can be loaded into main memory of a compute resource (a blade computer) or on top of a hypervisor and then executed to provide the functionality of the virtual server. A server image may be viewed as a kind of template for creating or instantiating a virtual server. The same server image may be used to instantiate multiple virtual servers, either on the same compute resource or on separate compute resources. The server image may be constructed or built targeted to a category or class of compute resources, and a virtual server instantiated from that server image may take advantage of or employ the compute resources that comport with that class of compute resources. For example, when a first server image is built according to a class of compute resources that includes a graphics processor, a virtual server instantiated from that first server image may employ the resources of one or more graphics processors. When a second server image is built according to a class of compute resources that includes a trusted security zone, a virtual server instantiated from that second server image may employ the resources of a trusted security zone.

The virtual computing environment 218 may comprise a first virtual server 236a executing on the physical host 234 that performs processing of a common function 238. A second virtual server 236b and a third virtual server 236c may likewise execute on the physical host 234 and may perform processing of the same common function 238 or different common functions. It is understood that the physical host 234 may be viewed as the collection of all the compute resources in the virtual computing environment 218: a plurality of processors, main memories, mass memories, and network interfaces. The virtual computing environment 218 may comprise any number of active or instantiated virtual servers 236 and any number of physical hosts 234 on which the virtual servers 236 execute. In some contexts, the virtual computing environment 218 may be said to constitute a core network or that a core network may comprise the virtual computing environment 218 (as well as comprising other network nodes that are not part of the virtual computing environment 218).

A communication may be initiated by the UE 102 by establishing a wireless communication link with the enhanced node B 104. The enhanced node B 104 may establish a communication link with the virtual computing environment 218, for example over a data communication interface such as an S1-U interface or an S1-C interface. The communication may be serviced by a plurality of network virtual functions and a plurality of common functions within the virtual computing environment 218 and link to the content server 240 to access content stored in a data store 242 or to link to the telephone 244 to conduct a voice call.

In an embodiment, the UE 102 initiates a trusted communication, for example to access confidential information via the content server 240 and the data store 242 (e.g., medical records, bank account information, or credit history information). The wireless link between the UE 102 and the enhanced node B 104 may be deemed to be inherently trusted or secure from hacking. The enhanced node B 104 may request a trusted communication link with the content server 240 by engaging in trusted signaling with the virtual computing environment 218. The enhanced node B 104 sends a trusted link request via a S1 interface to the virtual computing environment 218. A virtual server 236 may recognize the trusted link request and cause a common function 238 to transition to executing its trustlet.

The trustlet executes in a trusted security zone provided by the underlying physical host 234 in which the subject trustlet and virtual server 236 execute. The trustlet sends trust tokens to the enhanced node B 104 via the S1 interface, and a trusted communication link is established between the common function 238 and the enhanced node B 104. The trustlet may then signal with other virtual servers 236 and other common functions 238 to provide the appropriate virtualized network functions to support the desired trusted communication. One of the common functions may be the bearer common function 208 that provides the trusted communication link to the server 240.

The bearer common function 208, likewise executing in its trustlet in a trusted security zone of the physical host 234 in which its virtual server 236 executes, signals with the content server 240 to establish a trusted communication link. When the content server 240 provides the appropriate trust tokens and handshaking, the end-to-end trusted bearer path from the UE 102 to the content server 240 (or to the telephone 244, depending on the communication scenario) may be established.

Figure 5:
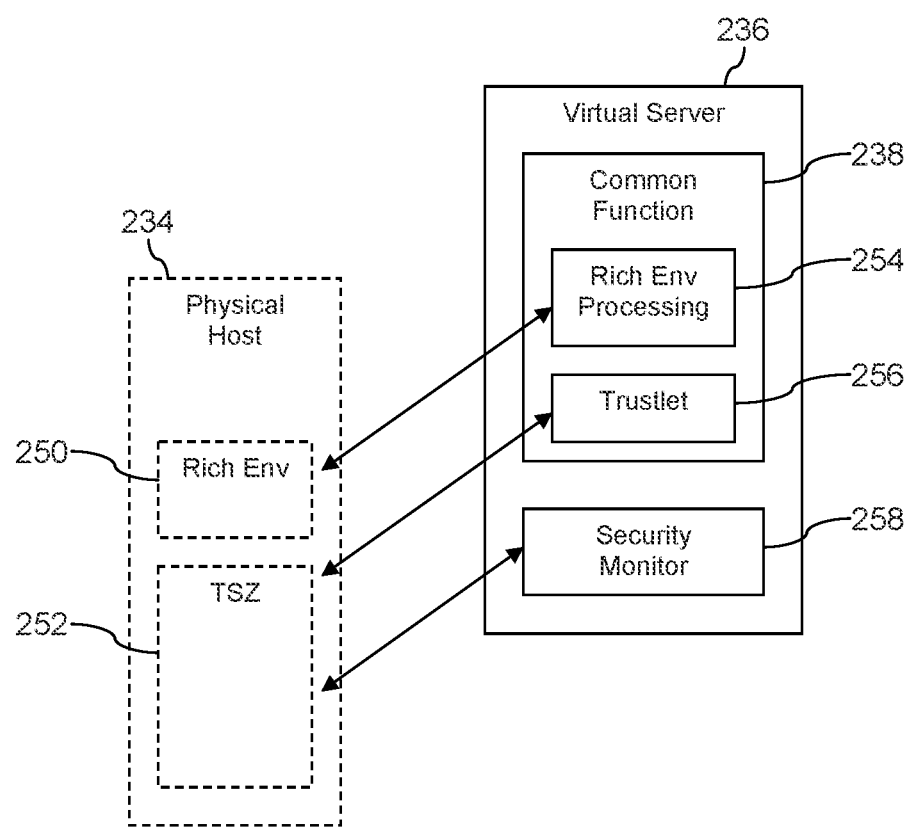
FIG. 5 is an illustration of an aspect of trusted execution in a virtualized computing environment according to an embodiment of the disclosure.

Turning now to FIG. 5, the overlay of a virtual server 236 on physical host 234 is described. The virtual server 236 executes using physical host 234. The virtual server 236 may not directly interact with the physical host 234 and instead may run on top of a hypervisor or on top of a logical operating system (an operating system that itself operates in the context of another operating system). Notwithstanding, the processing provided by the virtual server 236 is performed using the physical host 234. The physical host 234 may comprise a rich environment 250 and a trusted security zone 252. The details of trusted security zones are described further above. To briefly reprise here, a trusted security zone provides hardware assisted trust or hardware assisted security. A trusted security zone may comprise a portion of main memory. An operating system may mediate access to the main memory and may enforce the constraint that only instructions executing in trust may access the trusted portion of memory. Alternatively, the trusted portion of main memory may be physically isolated and only physically accessible to a trusted portion of a processor. A trusted security zone may be supported by a fundamental operation mode of processor units that prevents other potentially untrusted instructions executing concurrently with the trusted instructions (e.g., intercalated with the trusted instructions, as in a context switching situation or possibly when executed on a co-processor of a multi-core processor).

The rich environment 250 is the portion of main memory that is not trusted and any mass storage allocated to the virtual server 236. The rich environment 250 comprises the processor units that are not configured to have a trusted mode of operation or are not currently operating in a trusted mode of operation. The rich environment 250 may be considered to further comprise operating system commands that are disallowed when executing in the trusted mode of operation and/or accessing network interfaces that may be disallowed when executing in the trusted mode of operation.

The common function 238 executing in the virtual server 236 may comprise rich environment processing logic or instructions 254 and a trustlet 256. The rich environment processing 254 executes in the rich environment 250 of the physical host 234, and the trustlet 256 executes in the trusted security zone 252. A security monitor 258 may be part of an operating system in which the virtual server 236 executes or may be provided as part of the server image that is used to instantiate the virtual server 236. The security monitor 258 executes in the trusted security zone 252. The virtual server 236 may be configured or created to map execution of the trustlet 256 and the security monitor 258 to the trusted security zone 252. The security monitor 258 may be referred to in some contexts as a security monitor module or a security monitor component.

The security monitor 258 may be configured with an execution invocation handle (e.g., a logical address) of the trustlet 256 that it can use to launch and terminate the trustlet 256. The security monitor 258 may further be configured with the location of a trust flag in main memory of the physical host 234 or configured with a logical address that the operating system may map to a physical address to access the trust flag in main memory. The security monitor 258 may periodically poll the trust flag. When the trust flag is unset, no trusted communication request is pending. When the trust flag is set, a trusted communication request is pending. The security monitor 258 may further be configured with a physical address of a trusted communication request parameter list (or a logical address that the operating system can map to the trusted communication request parameter list). To handle a pending trusted communication request, the security monitor 258 may access and read the trusted communication request parameters. The security monitor 258 may first validate the trusted communication request parameters, for example validating a trust token provided in the parameters list.

The security monitor 258 may then cause the operating system (or may itself) to pause the rich environment processing 254 and may instantiate the trustlet 256, passing the trusted communication request parameters to the trustlet 256. Instantiating the trustlet 256 may be referred to in some contexts as allocating the trustlet 256 or allocating the trustlet 256 to the common function 238. The trustlet 256 may then handshake with the requesting communication node or common function and carry on trusted communications. When the trustlet 256 indicates that the trusted communication session is completed, the security monitor 258 may terminate the trustlet 256 and cause the rich environment processing 254 to resume execution.

In an embodiment, the security monitor 258 may maintain a registry of trustlets 256, for example in the situation where a plurality of instances of the common function 238 are executing on the same virtual server 236. The registry of trustlets 256 may comprise information associated with instantiated trustlets 256, for example an execution handle to use in communicating with each instantiated trustlet 256, a trust token, state information such as communication parameters associated with the instantiated trustlet 256.

Figure 6:
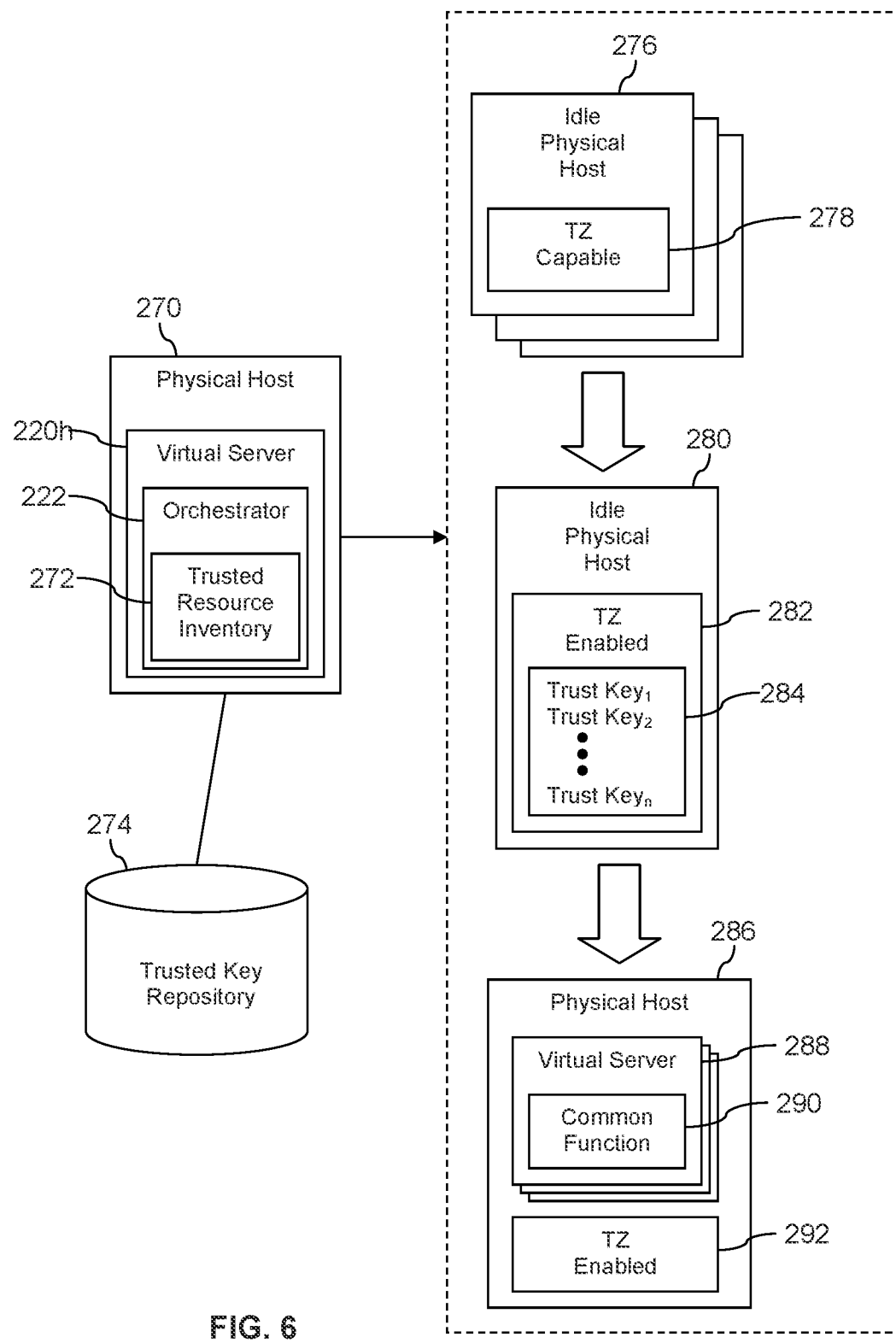
FIG. 6 is an illustration of dynamic instantiation of virtual servers according to an embodiment of the disclosure.

Turning now to FIG. 6, the orchestrator 222 (or another virtual computing environment application) is illustrated executing on a physical host 270 in virtual server 220h and dynamically initiating additional virtual servers to support trusted common functions operations. As said above, it is an advantage of a virtual computing environment that compute resources and/or virtual servers can be put into service and taken out of service on short notice, supporting the desirable function of providing computing resources on an as needed basis. When the orchestrator 222 or another application detects that additional compute power is needed to support current or projected near term demand, the orchestrator 222 locates an available idle host and instantiates a virtual server on that idle host or locates a host that has spare processing capacity and instantiates another virtual server on that host based on multi-tenancy principles of virtual computing.

When the additional compute power is desired to further support trusted operations, the orchestrator 222 (e.g., a trusted orchestrator) or another application (e.g., a trusted application executing in a trusted security zone of a virtual server) consults a trusted resource inventory 272 that identifies physical hosts that have resources that are able to support trusted operations. For example, the orchestrator 222 identifies a plurality of idle physical hosts 276 that each comprises a trusted security zone capability 278. The orchestrator 222 may select an idle physical host 280 and enable its trusted security zone capability 282 by provisioning a plurality of trust keys 284 into the enabled trust zone 282. In an embodiment, the orchestrator 222 or another application communicates over a trusted end-to-end communication link with a trusted key repository 274 to checkout or otherwise obtain trust keys 284 that it configures into the enabled trusted security zone 282.

When the orchestrator 222 or another application has enabled the trusted security zone 292 on an idle physical host 280, it instantiates one or more virtual servers 288 on the physical host 286 and launches the common function 290 in the virtual server 288. The common function 290 may then contribute to carrying the trusted processing burden. It is understood that hosts 276, 286, and 280 may be the same physical host represented at different points in time and in different states of provisioning. For example, one of the idle physical hosts 276 is transformed to the idle physical host 280 by enabling the trusted security zone 282 and provisioning it with trust keys 284; and the idle physical host 280 is transformed to the physical host 286 by instantiating the virtual server(s) 288 on the physical host 286 and launching the common function 290 in the virtual servers(s) 288.

Figure 7:
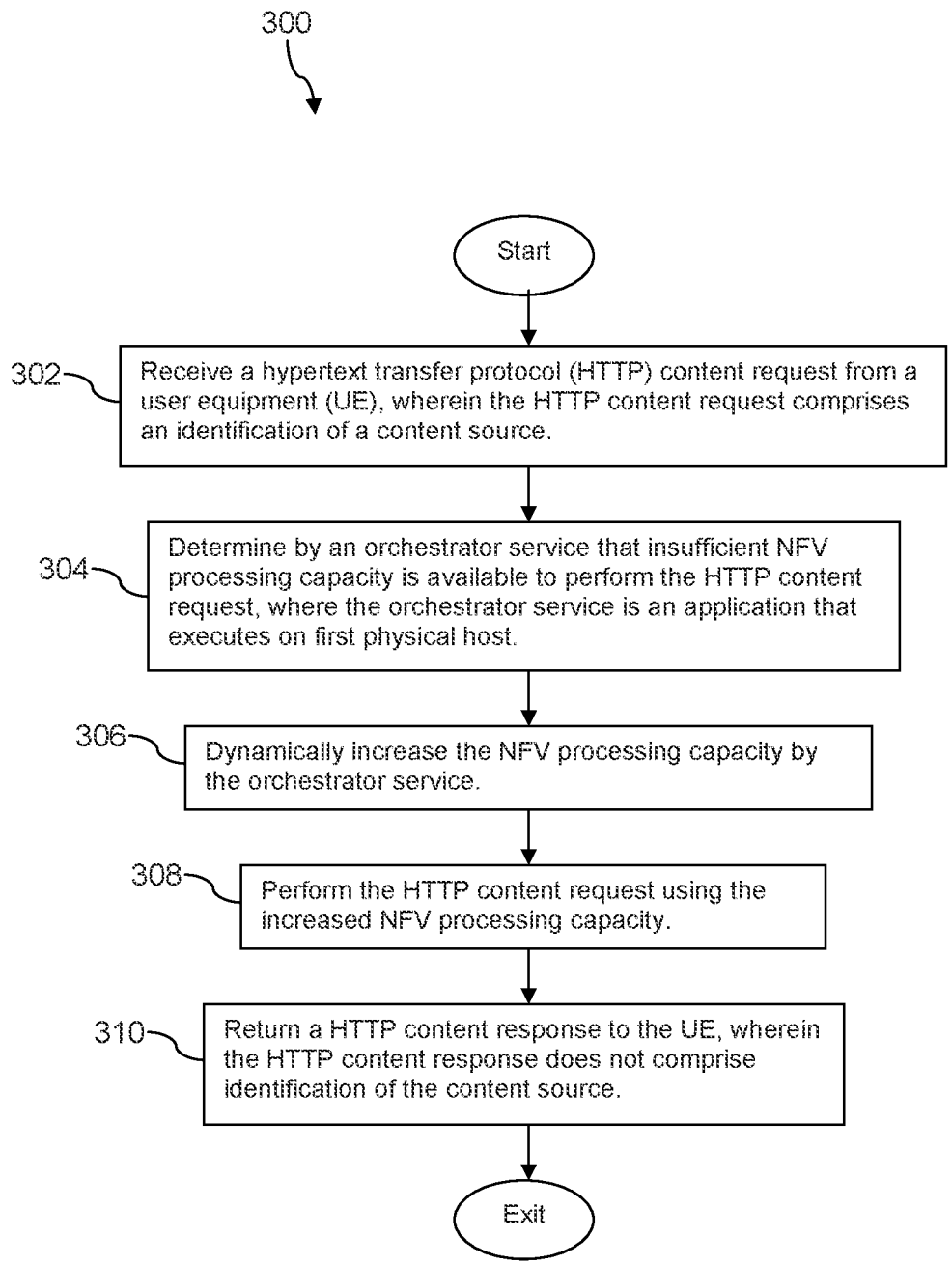
FIG. 7 is a flow chart of a method according to an embodiment of the disclosure.

Turning now to FIG. 7, a method 300 is described. At block 302, receive a hypertext transfer protocol (HTTP) content request from a user equipment (UE), wherein the HTTP content request comprises an identification of a content source. At block 304, determine by an orchestrator service that insufficient NFV processing capacity is available to perform the HTTP content request, where the orchestrator service is an application that executes on first physical host. At block 306, dynamically increase the NFV processing capacity by the orchestrator service. At block 308, perform the HTTP content request using the increased NFV processing capacity. At block 310, return a HTTP content response to the UE, wherein the HTTP content response does not comprise identification of the content source. The processing of block 310 may be provided by the content server 107/109 as described above with reference to FIG. 1A/FIG. 1B. The processing of block 310 may be referred to as quiet or taciturn HTTP.

Figure 8:
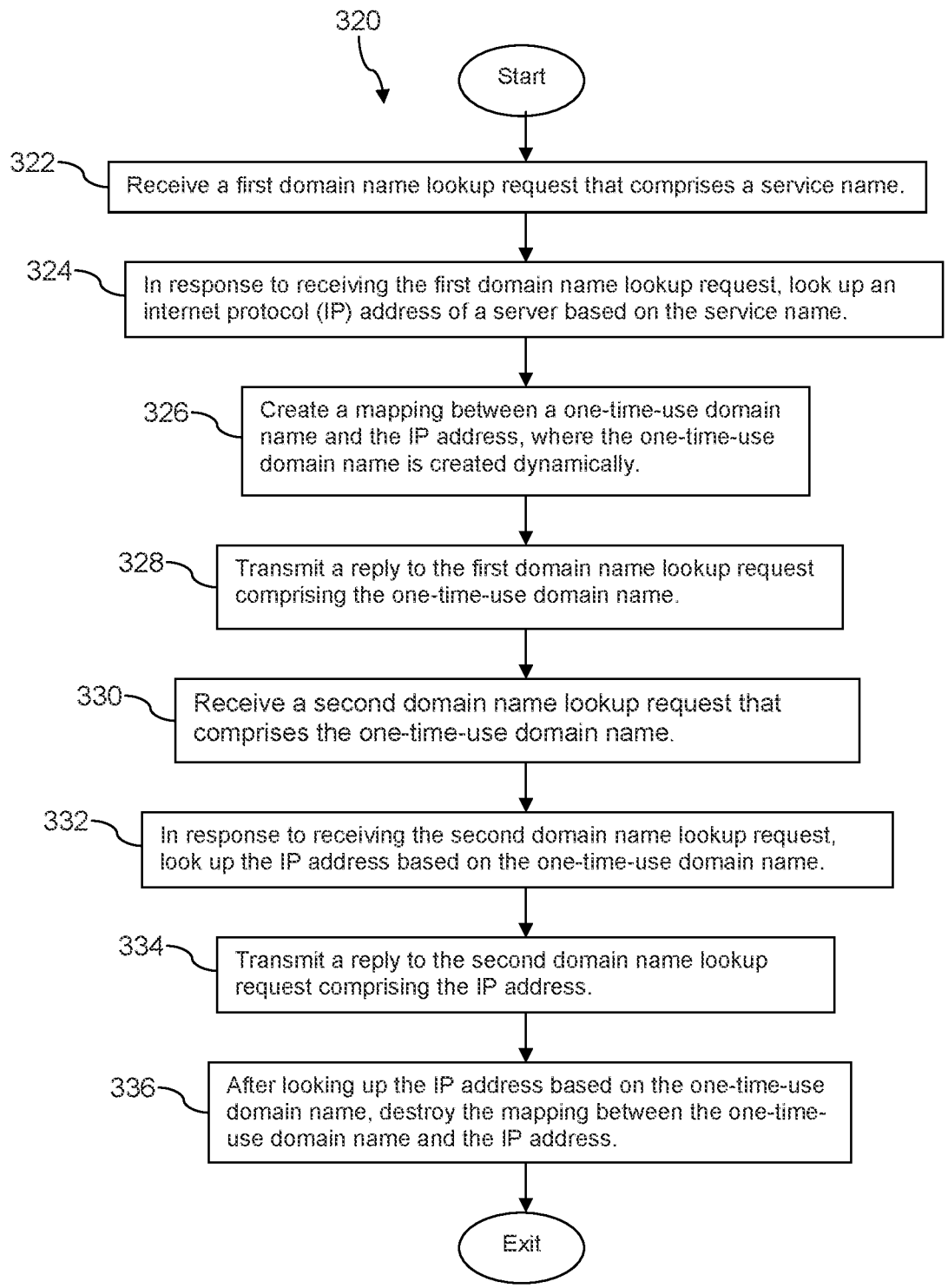
FIG. 8 is a flow chart of another method according to an embodiment of the disclosure.

Turning not to FIG. 8, a method 320 is described. At block 322, receive a first domain name lookup request that comprises a service name. At block 324, in response to receiving the first domain name lookup request, look up an internet protocol (IP) address of a server based on the service name. At block 326, create a mapping between a one-time-use domain name and the IP address, where the one-time-use domain name is created dynamically. At block 328, transmit a reply to the first domain name lookup request comprising the one-time-use domain name. At block 330, receive a second domain name lookup request that comprises the one-time-use domain name. At block 332, in response to receiving the second domain name lookup request, look up the IP address based on the one-time-use domain name. At block 334, transmit a reply to the second domain name lookup request comprising the IP address. At block 336, after looking up the IP address based on the one-time-use domain name, destroy the mapping between the one-time-use domain name and the IP address. The mapping may be destroyed before or after the reply to the second domain name lookup request is transmitted.

Figure 9:
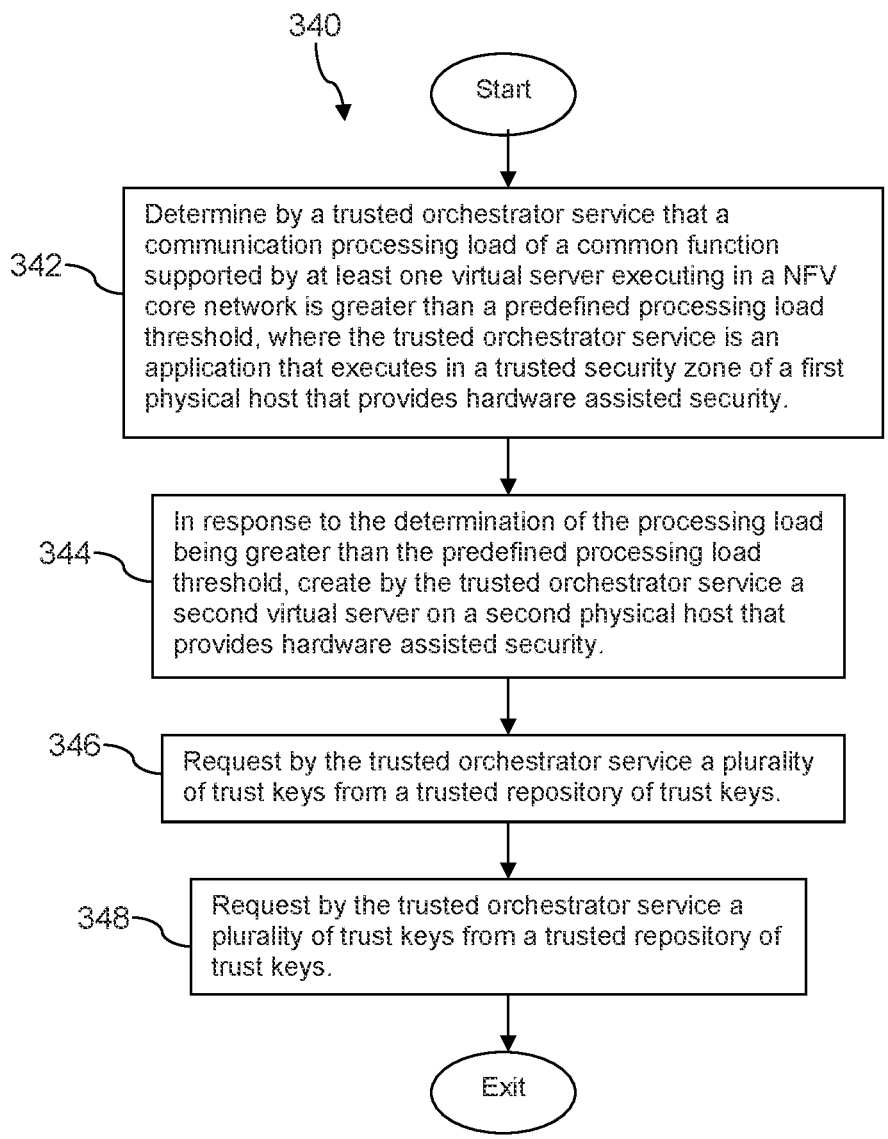
FIG. 9 is a flow chart of yet another method according to an embodiment of the disclosure.

Turning now to FIG. 9, a method 340 is described. At block 342, determine by a trusted orchestrator service that a communication processing load of a common function supported by at least one virtual server executing in a NFV core network is greater than a predefined processing load threshold, where the trusted orchestrator service is an application that executes in a trusted security zone of a first physical host that provides hardware assisted security. At block 344, in response to the determination of the processing load being greater than the predefined processing load threshold, create by the trusted orchestrator service a second virtual server on a second physical host that provides hardware assisted security. At block 346, request by the trusted orchestrator service a plurality of trust keys from a trusted repository of trust keys. At block 348, request by the trusted orchestrator service a plurality of trust keys from a trusted repository of trust keys.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 10:
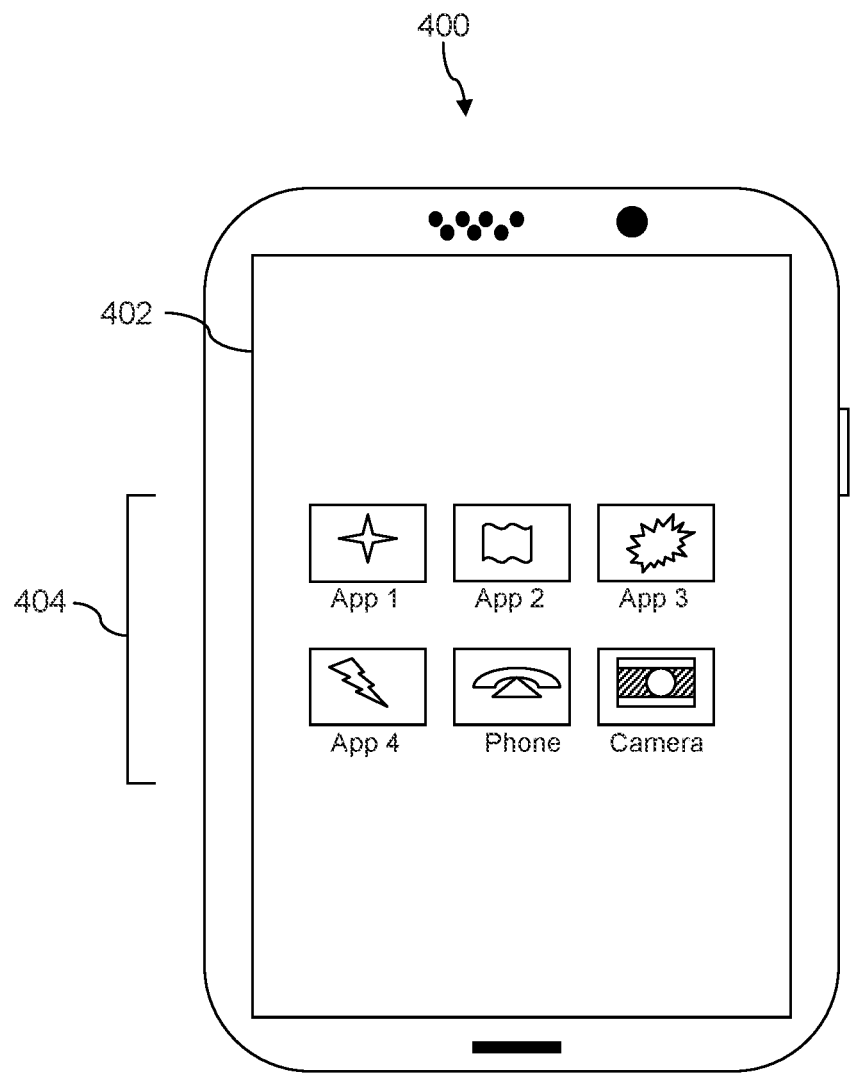
FIG. 10 is an illustration of a user equipment (UE) according to an embodiment of the disclosure.

FIG. 10 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 11:
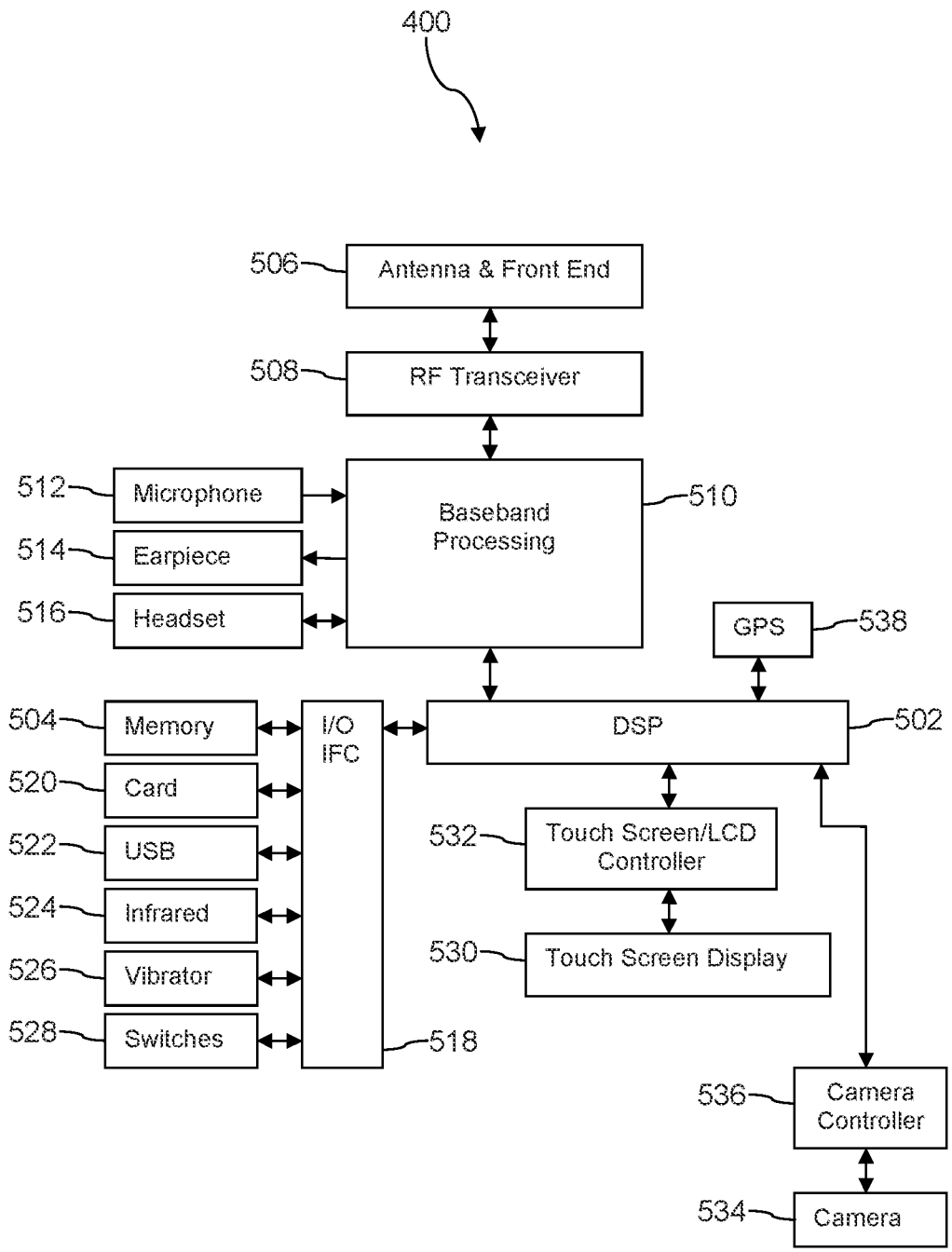
FIG. 11 is a block diagram of a hardware architecture of a UE according to an embodiment of the disclosure.

FIG. 11 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 12A:
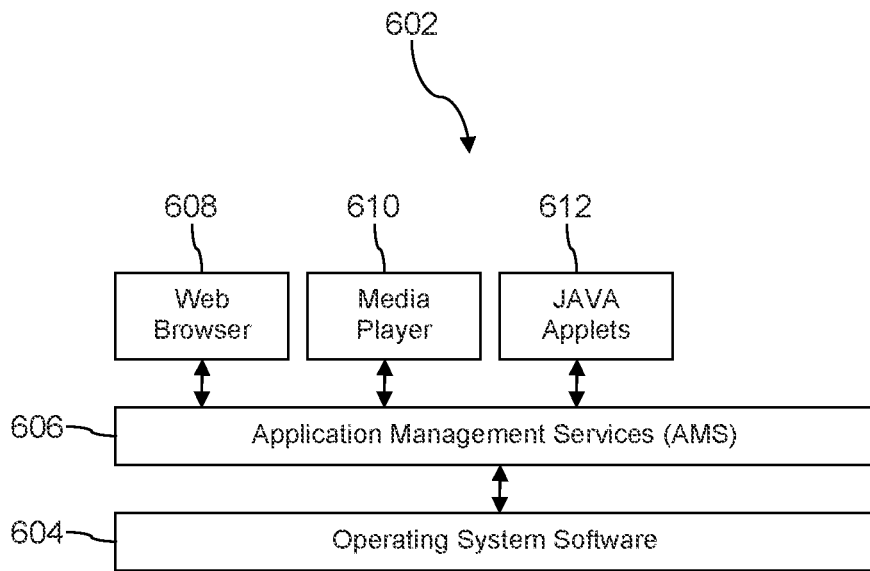
FIG. 12A is a block diagram of a software architecture of a UE according to an embodiment of the disclosure.

FIG. 12A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 12A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 12B:
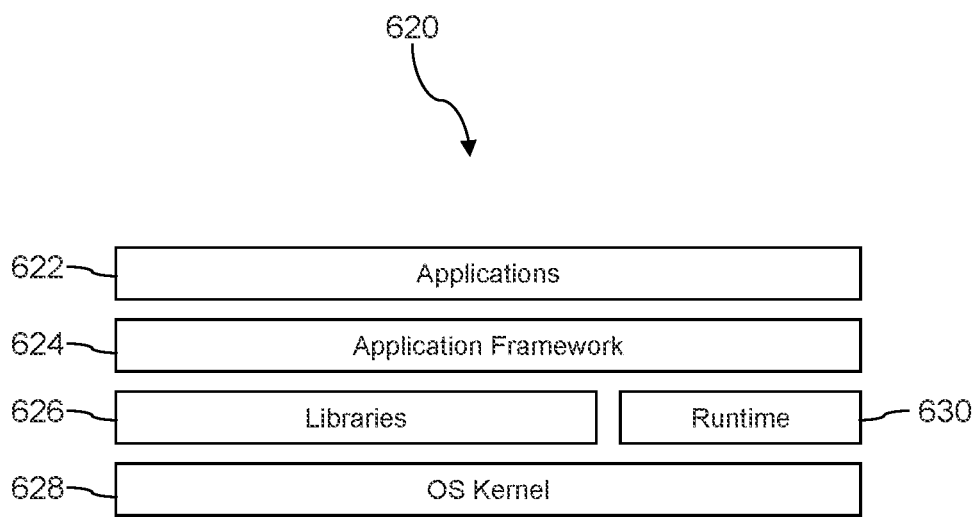
FIG. 12B is a block diagram of another software architecture of a UE according to an embodiment of the disclosure.

FIG. 12B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 13:
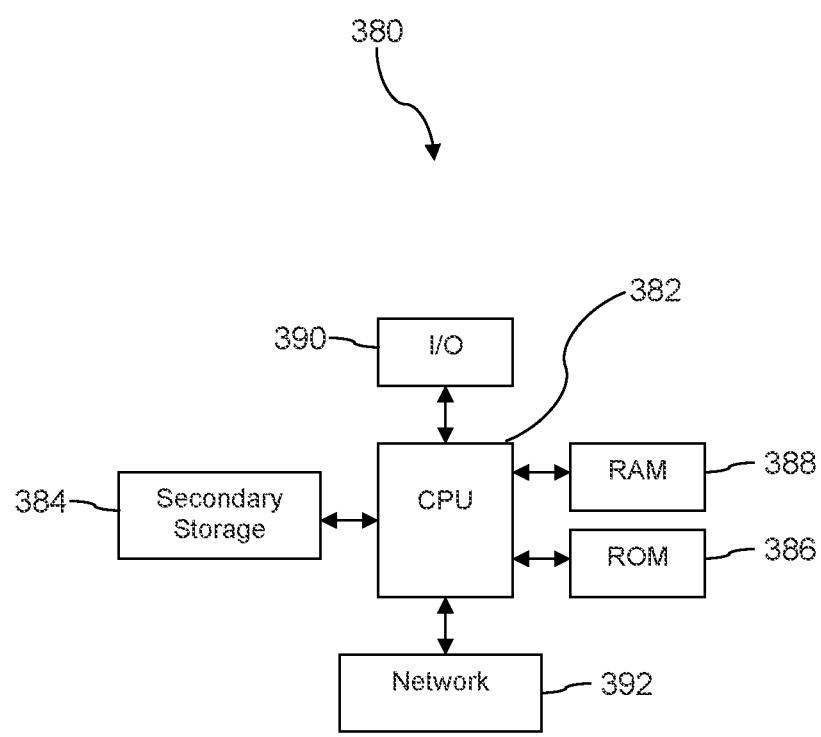
FIG. 13 is a block diagram of a computer system according to an embodiment of the disclosure.

FIG. 13 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a trusted communication service using network function virtualization (NFV), comprising:

determining by a trusted orchestrator service that a communication processing load of a common function supported by at least one virtual server executing in a NFV core network is greater than a predefined processing load threshold, where the trusted orchestrator service is an application that executes in a trusted security zone of a first physical host that provides hardware assisted security;

in response to the determination of the processing load being greater than the predefined processing load threshold, creating by the trusted orchestrator service a second virtual server on a second physical host that provides hardware assisted security;

requesting by the trusted orchestrator service a plurality of trust keys from a trusted repository of trust keys, wherein the trusted orchestrator service communicates over a trusted end-to-end communication link with the trusted repository of trust keys to obtain the plurality of trust keys;

initiating by the trusted orchestrator service at least one instance of the common function in the second virtual server, wherein the at least one instance of the common function is configured with at least one of the plurality of trust keys received from the trusted repository;

enabling by the trusted orchestrator service a trusted security zone of the second physical host; and provisioning by the trusted orchestrator service the plurality of trusted keys into the enabled trusted security zone of the second physical host.

2. The method of claim 1, wherein the common function is one of a policy function, a mobility function, a bearer function, a context function, an authentication function, an attach function, and a data function.

3. The method of claim 1, wherein the trusted orchestrator service is part of an orchestrator service, wherein the orchestrator service provides communication services to user equipments (UEs) in the NFV core network by invoking a plurality of common functions executing on virtual servers in the NFV core network to compose the communication services.

4. The method of claim 3, wherein the common functions comprise a mobility function, a bearer function, a context function, an authentication function, an attach function, and a data function, wherein a plurality of the common functions comprise an associated common function trustlet that executes in a trusted security zone of the physical host on which the common function executes.

5. The method of claim 4, wherein the common function trustlet is an extract of a plurality of executable instructions of the associated common function that execute in the trusted security zone.

6. The method of claim 3, wherein the UEs comprise mobile smart phones, media players, personal digital assistants (PDAs), laptop computers, notebook computers, tablet computers, wearable computers, and headset computers.

7. The method of claim 1, wherein the common function comprises a trustlet that executes in the trusted security zone of the second physical host.

8. The method of claim 7, further comprising:

initiating by a user equipment (UE) a trusted communication to access data via a content server;

in response to the initiation, requesting by an enhanced node B a trusted communication link with the content server by sending a trusted link request to the core NFV network;

transitioning the common function to executing the trustlet in response to the trusted link request from the enhanced node B;

sending by the trustlet the at least one of the plurality of trust keys to the enhanced node B, wherein a trusted communication link is established between the common function and the enhanced node B based on the at least one of the plurality of trust keys; and establishing an end-to-end trusted bearer path from the UE to the content server based at least in part on the trusted communication link between the common function and the enhanced node B.

9. A system for providing a trusted communication service using network function virtualization (NFV), comprising:

a non-transitory memory;

a processor; and a trusted orchestrator service stored in the non-transitory memory that, when executed by the processor:

determines that a communication processing load of a common function supported by at least one virtual server executing in a NFV core network is greater than a predefined processing load threshold, where the trusted orchestrator service is an application that executes in a trusted security zone of a first physical host that provides hardware assisted security, in response to the determination of the processing load being greater than the predefined processing load threshold, creates a second virtual server on a second physical host that provides hardware assisted security, requests a plurality of trust keys from a trusted repository of trust keys, wherein the trusted orchestrator service communicates over a trusted end-to-end communication link with the trusted repository of trust keys to obtain the plurality of trust keys, initiates at least one instance of the common function in the second virtual server, wherein the at least one instance of the common function is configured with at least one of the plurality of trust keys received from the trusted repository, enables a trusted security zone of the second physical host, and provisions the plurality of trusted keys into the enabled trusted security zone of the second physical host.

10. The system of claim 9, wherein the common function is one of a policy function, a mobility function, a bearer function, a context function, an authentication function, an attach function, and a data function.

11. The system of claim 9, wherein the trusted orchestrator service is part of an orchestrator service, wherein the orchestrator service provides communication services to user equipments (UEs) in the NFV core network by invoking a plurality of common functions executing on virtual servers in the NFV core network to compose the communication services.

12. The system of claim 11, wherein the common functions comprise a mobility function, a bearer function, a context function, an authentication function, an attach function, and a data function, wherein a plurality of the common functions comprise an associated common function trustlet that executes in a trusted security zone of the physical host on which the common function executes.

13. The system of claim 12, wherein the common function trustlet is an extract of a plurality of executable instructions of the associated common function that execute in the trusted security zone.

14. The system of claim 11, wherein the UEs comprise mobile smart phones, media players, personal digital assistants (PDAs), laptop computers, notebook computers, tablet computers, wearable computers, and headset computers.

15. The system of claim 9, wherein the common function comprises a trustlet that executes in the trusted security zone of the second physical host.

16. The system of claim 15, wherein the common function is transitioned to executing the trustlet based on a trusted link request from an enhanced node B in response to a user equipment (UE) initiating a trusted communication to access data via a content server, wherein the trustlet sends the at least one of the plurality of trust keys to the enhanced node B, wherein a trusted communication link is established between the common function and the enhanced node B based on the at least one of the plurality of trust keys, and wherein an end-to-end trusted bearer path from the UE to the content server is established based at least in part on the trusted communication link between the common function and the enhanced node B.

* * * * *